United States Patent
Yasumura

(10) Patent No.: US 6,839,245 B2
(45) Date of Patent: Jan. 4, 2005

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 10/294,649

(22) Filed: Nov. 15, 2002

(65) Prior Publication Data
US 2003/0095419 A1 May 22, 2003

(30) Foreign Application Priority Data

| Nov. 16, 2001 | (JP) | ......................................... | 2001-351880 |
| Nov. 21, 2001 | (JP) | ......................................... | 2001-355932 |
| Nov. 21, 2001 | (JP) | ......................................... | 2001-355933 |
| Aug. 1, 2002 | (JP) | ......................................... | 2002-224781 |

(51) Int. Cl.$^7$ ......................................... H02M 3/335
(52) U.S. Cl. .................. 363/21.02; 363/21.04; 363/97
(58) Field of Search .................. 363/19, 20, 21.01, 363/21.02, 21.04, 97

(56) References Cited

U.S. PATENT DOCUMENTS

| 4,736,283 A | | 4/1988 | Yasumura | |
| 5,430,633 A | | 7/1995 | Smith | |
| 5,880,943 A | | 3/1999 | Yokoyama | |
| 6,366,476 B1 | * | 4/2002 | Yasumura | ................ 363/21.02 |
| 6,396,717 B2 | * | 5/2002 | Yasumura | ................ 363/21.02 |
| 6,466,463 B1 | * | 10/2002 | Morita | .................... 363/21.16 |
| 6,496,389 B1 | * | 12/2002 | Yasumura | ................ 363/21.04 |

FOREIGN PATENT DOCUMENTS

EP    0 404 191    12/1990

* cited by examiner

Primary Examiner—Michael Sherry
Assistant Examiner—Gary L. Laxton
(74) Attorney, Agent, or Firm—Oblon, Spivak, McClelland, Maier & Neustadt, P.C.

(57) ABSTRACT

A switching power supply circuit ready for worldwide use is disclosed which suppresses a variation of a pulse voltage to be fed back when the alternating-current input varies. The switching power supply circuit includes a composite resonance type converter of a switching frequency control scheme wherein a voltage resonance pulse voltage generated in a primary side voltage resonance converter is fed back to a rectification diode through a high speed diode and an inductance or a transformer. An active clamp circuit is provided on the primary side to clamp the voltage resonance pulse voltage.

10 Claims, 16 Drawing Sheets

{ BROKEN LINE: WITHOUT PFI
  SOLID LINE : WITH PFI

{ BROKEN LINE: WITHOUT PFI
  SOLID LINE : WITH PFI

{ BROKEN LINE: WITHOUT PFI
  SOLID LINE : WITH PFI

{ BROKEN LINE: WITHOUT PFI
  SOLID LINE : WITH PFI

F I G. 1 4
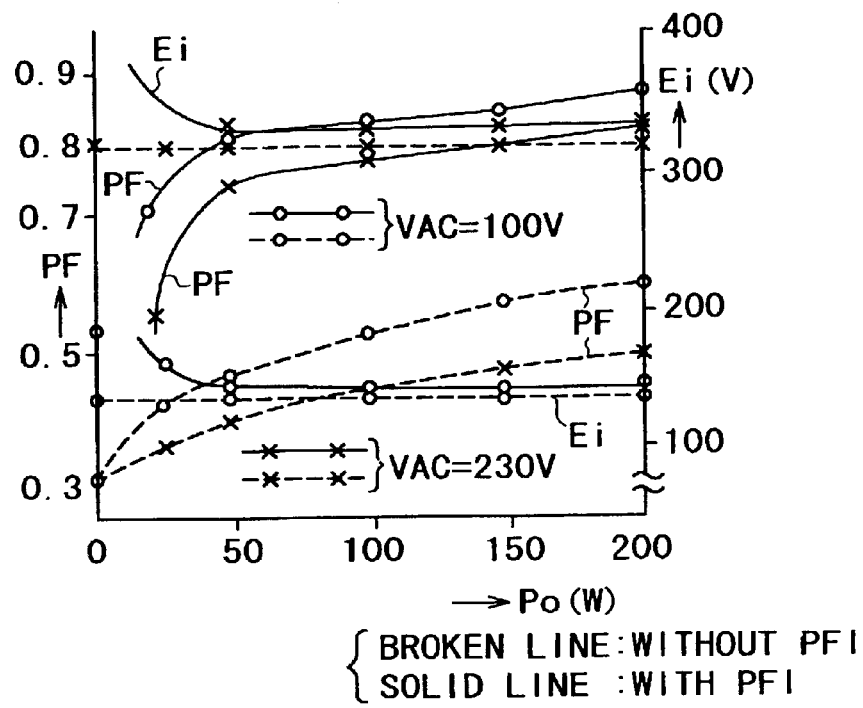
{ BROKEN LINE: WITHOUT PFI
SOLID LINE : WITH PFI
F I G. 1 5
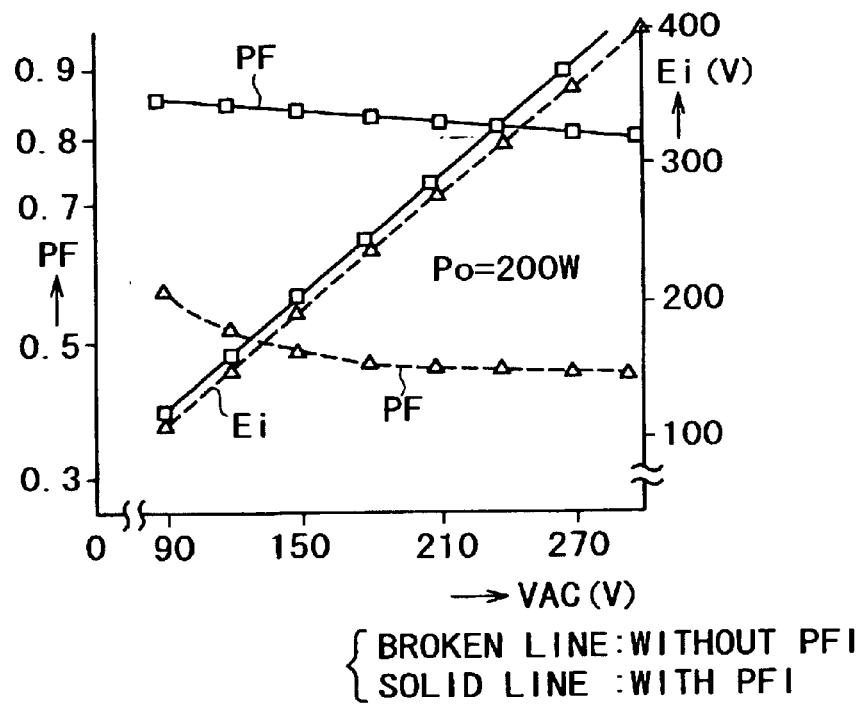
{ BROKEN LINE: WITHOUT PFI
SOLID LINE : WITH PFI

SWITCHING POWER SUPPLY CIRCUIT

BACKGROUND OF THE INVENTION

This invention relates to a switching power supply circuit having a power factor improving function.

Various power supply circuits in the form of a composite resonance type converter wherein a resonance type converter is provided on the primary side and a resonance circuit is provided also on the secondary side have been proposed by the assignee of the present application. Also various power circuits which include a power factor improvement circuit for improving the power factor of a composite resonance type converter have been proposed by the assignee of the present application.

Among such power factor improving circuits, power factor improving circuits of the voltage feedback type have been proposed wherein a voltage resonance pulse voltage generated on the primary side is fed back to a smoothing capacitor to increase the conduction angle of alternating-current input current to improve the power factor. As power factor improving circuits of the type described, various circuits including a circuit of the electrostatic capacity coupling type having a capacitor voltage dividing scheme, a circuit of the magnetic coupling type of a capacity voltage dividing scheme, a circuit of the magnetic coupling type of a tertiary winding scheme and a circuit of the diode coupling type of a tertiary winding scheme have been proposed by the assignee of the present patent application.

It is considered that, among the various power factor improving circuits mentioned, the power factor improving circuit of the diode coupling type of a tertiary winding scheme is most useful in terms of the power conversion efficiency, the cost, the variation characteristic of the direct-current input voltage, the zero volt switching (ZVS) operation region of a switching element and so forth.

Here, an example of a switching power supply circuit which includes a power factor improving circuit of the diode coupling type of a tertiary winding scheme as a related art apparatus is described with reference to FIG. 17.

Referring to FIG. 17, the power supply circuit shown includes a power factor improving circuit 20 for improving the power factor of a switching converter of the voltage resonance type.

The power supply circuit further includes a line filter 21 provided for a commercial alternating-current power AC and formed from, for example, a line filter transformer or an across-the-line capacitor (capacitor for filtering noise of a power supply). The power supply circuit further includes a bridge rectifier circuit Di for full-wave rectifying the commercial alternating-current power AC.

A rectification output of the bridge rectifier circuit Di is charged into a smoothing capacitor Ci through the power factor improving circuit 20. Thus, a rectified and smoothed voltage Ei is obtained across the smoothing capacitor Ci.

The voltage resonance type converter includes a switching element Q1 in the form of, for example, a MOS-FET.

A clamp diode DD is interposed between the drain and the source of the switching element Q1 such that it forms a path for clamp current which flows when the switching element Q1 is off.

The drain of the switching element Q1 is connected to a positive terminal of a smoothing capacitor Ci through a primary winding N1 of an isolating converter transformer PIT. The source of the switching element Q1 is connected to a ground on the primary side.

A switching driving signal from a switching driving circuit not shown is applied to the gate of the switching element Q1 so that the switching element Q1 performs a switching operation in response to the switching driving signal. The switching driving signal has a frequency which is varied, for example, in response to the level of a secondary-side direct-current output voltage. Thus, the secondary-side direct-current output voltage is stabilized through the switching frequency control.

Further, a parallel resonance capacitor Cr is connected between the drain and the source of the switching element Q1. The parallel resonance capacitor Cr has a capacitance which cooperates with a leakage inductance L1 of the primary winding N1 side of the isolating converter transformer PIT to form a primary-side parallel resonant circuit of the voltage resonance type converter. When the switching element Q1 is off, the parallel resonant circuit acts such that the voltage across the resonance capacitor Cr actually exhibits a pulse waveform of a sine wave, whereby operation of the voltage resonance type is obtained.

One end of the primary winding N1 of the isolating converter transformer PIT is connected to the drain of the switching element Q1 while the other end of the primary winding N1 is connected to the positive electrode (rectified and smoothed voltage Ei) of the smoothing capacitor Ci.

A tertiary winding N3 as a separate winding is formed at the same place as that of the primary winding N1, that is, on the primary side. The tertiary winding N3 functions as a feedback winding, and a terminal end of the tertiary winding N3 is connected to an anode point of a high speed recovery type diode D3 of the power factor improving circuit 20 through a series resonant capacitor C10.

On the secondary side of the isolating converter transformer PIT, an alternating voltage induced by the primary winding N1 is generated in a secondary winding N2. In this instance, since a secondary side parallel resonant capacitor C2 is connected in parallel to the secondary winding N2, a parallel resonant circuit is formed from a leakage inductance L2 of the secondary winding N2 and the capacitance of the secondary side parallel resonant capacitor C2. By the parallel resonant circuit, the alternating voltage excited in the secondary winding N2 becomes a resonance voltage. In other words, a voltage resonance operation is obtained on the secondary side.

In particular, in the power supply circuit, a parallel resonant circuit for providing a switching operation of the voltage resonance type is provided on the primary side while another parallel resonant circuit for obtaining a voltage resonance operation is provided on the secondary side. In other words, a composite resonance type switching converter is formed in the power supply circuit.

In this instance, a rectification diode Do1 and a smoothing capacitor Co1 are connected in such a manner as seen in FIG. 17 to the secondary side parallel resonant circuit formed in such a manner as described above such that a half-wave rectifying smoothing circuit, which forms a direct-current output voltage Eo1, is formed.

Now, a configuration of the power factor improving circuit 20 is described.

In the power factor improving circuit 20, a choke coil Ls and the high speed recovery type diode D3 are connected in series and interposed between the positive output terminal of the bridge rectifier circuit Di and the positive terminal of the smoothing capacitor Ci.

A filter capacitor CN is connected in parallel to the series connection of the choke coil Ls and the high speed recovery type diode D3 so as to form a low pass filter of the normal mode together with the choke coil Ls.

The tertiary winding N3 of the isolating converter transformer PIT is connected to a node between the anode of the high speed recovery type diode D3 and choke coil Ls of the power factor improving circuit 20 through the series resonant capacitor C10 so that a switching output voltage (voltage resonance pulse voltage) obtained by the primary-side parallel resonant circuit is fed back to the power factor improving circuit 20.

In this instance, when the absolute voltage of an alternating-current input voltage VAC exhibits a value in the proximity of a peak thereof, the high speed recovery type diode D3 conducts and charging current flows from the alternating-current input power supply AC to the smoothing capacitor Ci through the choke coil Ls and the high speed recovery type diode D3. Simultaneously, a voltage resonance pulse voltage of the tertiary winding N3 is fed back to the series circuit of the series resonant capacitor C10 and the high speed recovery type diode D3 to cause the high speed recovery type diode D3 to effect a switching operation to increase the conduction angle of an alternating-current input current IAC thereby to achieve a power factor improving function.

If the absolute value of the alternating-current input voltage VAC decreases, then the high speed recovery type diode D3 is rendered non-conducting, and the tertiary winding N3 which provides the voltage resonance pulse voltage cooperates with the series circuit of the series resonant capacitor C10, choke coil Ls and filter capacitor CN to form a series resonant circuit.

FIGS. 18 and 19 show operation waveforms of the components of the circuit described above. Particularly, FIG. 18 shows operation waveforms when the alternating-current input voltage VAC has a value around the zero voltage while FIG. 19 shows operation waveforms when the alternating-current input voltage VAC has a value around a peak voltage.

Referring to FIG. 18, it can be seen from the waveforms of the current iQ and the voltage vds of the switching element Q1 that the operation of the circuit described above is a ZVS operation and the switching loss can be reduced.

Further, the circuit generates a voltage of a waveform similar to that of the voltage vds of the switching element Q1 as a tertiary winding voltage V3. When the voltage V3 is applied to the series resonant capacitor C10, choke coil Ls and filter capacitor CN and resonance current flows, the anode terminal voltage of the high speed recovery type diode D3 oscillates in a switching period. When the alternating-current input voltage VAC is around 0, the input rectification voltage V1 is low, and therefore, the anode voltage of the high speed recovery type diode D3 wherein a voltage generated by the choke coil Ls is superposed on the input rectification voltage V1 is normally lower than the cathode voltage which is the voltage Ei across the smoothing capacitor Ci and the high speed recovery type diode D3 remains in an off state. Accordingly, no alternating-current input current flows.

If the alternating-current input voltage VAC rises until it exceeds the input rectification voltage V1, then since the anode voltage of the high speed recovery type diode D3 becomes higher than the input smoothed voltage Ei due to the voltage superposed thereon, the high speed recovery type diode D3 is rendered conducting and the alternating-current input current IAC begins to flow through the high speed recovery type diode D3. Accordingly, since the alternating-current input current IAC begins to flow at a timing of the alternating-current input voltage VAC which is lower by the voltage generated by the choke coil Ls than the input smoothed voltage Ei, the conduction angle of the alternating-current input current IAC increases and the power factor can be improved.

Incidentally, there is a demand to make a switching power supply circuit ready for both of the 100 V type and the 200 V type as the alternating-current input voltage VAC in order to make it possible for the switching power supply circuit to be ready for worldwide use.

In order for the switching power supply circuit to satisfy a requirement for a load power variation from 200 W to 0 W against an input variation between the 100 V type and the 200 V type, an active voltage clamp circuit must be added to the primary side of the composite resonance type converter to increase the control range of the switching operation.

In this instance, it is a possible idea to dispose an active voltage clamp circuit on the primary side of such a circuit as shown in FIG. 17 which includes the power factor improving circuit 20 of the diode coupling-type of a tertiary winding scheme. The circuit arrangement, however, has the following problems.

Even if, where the alternating-current input voltage VAC is of the 100 V type, the power factor is improved to approximately 0.85 and a harmonic distortion control value is satisfied, where the alternating-current input voltage VAC is 230 V, the power factor exhibits a drop to approximately 0.7 and a harmonic distortion control value is not satisfied. Therefore, a power supply circuit of an improved power factor ready for worldwide use cannot be achieved.

Further, the circuit described above exhibits a great drop of the power factor as the load power decreases and does not make a power supply of a stabilized improved power factor which operates suitably in response to a variation of the load.

For example, FIG. 20 illustrates a variation characteristic of the power factor with respect to the load current of the circuit described above with reference to FIG. 17. As seen FIG. 20, in the variation characteristic shown, the power factor drops as the load current decreases.

Meanwhile, in order to assure a ZVS operation region, the series resonance frequency of the power factor improving circuit 20 need be set lower than the switching frequency.

When the alternating-current input voltage VAC is low, if the high speed recovery type diode D3 is ignored because it is off, then the power factor improving circuit 20 is regarded as an LC series resonant circuit wherein the tertiary winding N3 serves as a voltage source. If the switching frequency is lower than the series resonance frequency, then since the LC series resonant circuit acts as a capacitive circuit at the frequency, the current flowing therethrough has a leading phase with respect to the voltage V3 generated in the tertiary winding N3. Since the voltage V3 induced has a waveform similar to the voltage vds across the switching element Q1, at a point of time when the resonance voltage of the switching element Q1 decreases until it reaches a voltage proximate to 0, the current flows from the series resonant capacitor C10 toward the tertiary winding N3. The voltage vds across the switching element Q1 is used to charge or discharge the parallel resonance capacitor Cr through the inductances L1 and L2 until 0 volt is reached to realize a ZVS operation of the switching element Q1. In the case described above, however, since the current which should discharge the parallel resonance capacitor Cr through the inductances L1 and L2 is weakened with the current to be supplied from the tertiary winding N3 to the primary winding N1, the parallel resonance capacitor Cr cannot be discharged fully, which disables the ZVS operation. Consequently, when the switching element Q1 is switched on, switching loss is generated and drops the efficiency.

Consequently, the series resonance frequency of the power factor improving circuit 20 need be set lower than the switching frequency as described above. This, however, provides restriction to the value of the inductance Ls of the power factor improving circuit 20 and the electrostatic capacitance value of the series resonant capacitor C10 and makes optimum designing difficult.

SUMMARY OF THE INVENTION

It is an object of the present invention to provide a switching power supply circuit including a power factor improving composite resonance type converter which is ready for worldwide use.

In order to attain the object described above, according to an aspect of the present invention, there is provided a switching power supply circuit, including rectifying smoothing means for rectifying a commercial alternating-current power by means of a bridge rectification circuit to obtain a direct-current input voltage, smoothing the direct-current input voltage by means of a smoothing capacitor and outputting the smoothed direct-current input voltage, an isolating converter transformer for transmitting a primary side output to a secondary side thereof, the isolating converter transformer having a gap formed therein so that a required coupling coefficient with which a primary winding and a secondary winding are coupled loosely may be obtained, switching means for switching the direct-current input voltage on and off by means of a switching element and outputting the resulting voltage to the primary winding of the isolating converter transformer, a primary-side resonance circuit formed at least from a leakage inductance component including the primary winding of the isolating converter transformer and a capacitance of a primary side parallel resonance capacitor for causing the switching means to perform operation of the voltage resonance type, voltage generation means for generating a voltage corresponding to a switching output voltage obtained by the primary-side resonance circuit, power factor improving means including a low speed recovery type diode, a high speed recovery type diode and an inductance for feeding back the voltage obtained by the voltage generation means, the low speed recovery type diode being connected between the bridge rectification circuit and the smoothing capacitor, at least the high speed recovery type diode and the inductance being connected in series, the series connection of the high speed recovery type diode and the inductance being connected in parallel to the low speed recovery type diode, active clamp means formed from a series connection circuit of a clamp capacitor and an auxiliary switching element for clamping the output voltage of the primary-side resonance circuit, a secondary-side resonance circuit formed from a leakage inductance component of the secondary winding of the isolating converter transformer and a capacitance of a secondary side resonance capacitor on the secondary side, and direct-current output voltage production means formed by including the secondary-side resonance circuit for receiving and rectifying an alternating voltage obtained by the secondary winding of the isolating converter transformer to produce a secondary-side direct-current output voltage.

Preferably, the switching power supply circuit further includes constant-voltage control means for performing constant-voltage control for the secondary-side direct-current output voltage in response to a level of the secondary-side direct-current output voltage.

The switching power supply circuit may be configured such that the isolating converter transformer further includes a tertiary winding provided on the primary side thereof and serving as the voltage generation means, and the active clamp means clamps the switching output voltage obtained by the primary-side resonance circuit and the switching output voltage obtained by the primary-side resonance circuit and clamped by the active clamp means is fed back to the power factor improving means through the tertiary winding.

As an alternative, the switching power supply circuit may be configured such that it further includes a transformer including a secondary winding which serves as the inductance of the power factor improving means, and a primary winding of the transformer is connected between the primary winding of the isolating converter transformer and the smoothing capacitor and serves as the voltage generation means, and the active clamp means clamps the switching output voltage obtained by the primary-side resonance circuit and the switching output voltage obtained by the primary-side resonance circuit and clamped by the active clamp means is fed back to the power factor improving means through the transformer.

As another alternative, the switching power supply circuit may be configured such that it further includes a capacitor connected in parallel to the inductance of the power factor improving means to form a parallel circuit, and the clamp capacitor of the active clamp means is connected to a node between the high speed recovery type diode and the parallel circuit and serves as the voltage generation means, and a pulse voltage generated in a series connection circuit of the clamp capacitor and the auxiliary switching element is fed back to the power factor improving means in response to the switching output voltage obtained by the primary-side resonance circuit.

According to another aspect of the present invention, there is provided a switching power supply circuit, including smoothing means for smoothing rectification current by means of a pair of smoothing capacitors connected in series and outputting a double direct-current input voltage, an isolating converter transformer for transmitting a primary side output to a secondary side thereof, the isolating converter transformer having a gap formed therein so that a required coupling coefficient with which a primary winding and a secondary winding are coupled loosely may be obtained, switching means for switching the double direct-current input voltage on and off by means of a switching element and outputting the resulting voltage to the primary winding of the isolating converter transformer, a primary-side resonance circuit formed at least from a leakage inductance component including the primary winding of the isolating converter transformer and a capacitance of a primary side parallel resonance capacitor for causing the switching means to perform operation of the voltage resonance type, voltage generation means for generating a voltage corresponding to a switching output voltage obtained by the primary-side resonance circuit, power factor improving rectification means including a first rectification circuit formed from a pair of high speed recovery type diodes connected in series and a second rectification circuit formed from a pair of low speed recovery type diodes connected in series for rectifying an alternating-current power supply to produce rectification current and supplying the rectification current to the smoothing means, the power factor improving means further including a first inductance to which one of the high speed recovery type diodes is connected in series and a second inductance to which the other of the high speed recovery type diodes is connected in series, the high speed recovery type diodes switching the rectification current on and off based on the voltage obtained by the voltage generation means to improve the power factor, active clamp means formed from a series connection circuit of a clamp capacitor and an auxiliary switching element for clamping the voltage based on the primary-side resonance circuit, a secondary-side resonance circuit formed from a leakage inductance component of the secondary winding of the isolating converter transformer and a capacitance of a secondary side resonance capacitor on the secondary side, and direct-current output voltage production means formed by including the secondary-side resonance circuit for receiving and rectifying an alternating voltage obtained by the secondary winding of the isolating converter transformer to produce a secondary-side direct-current output voltage.

The switching power supply circuit may further include constant-voltage control means for performing constant-voltage control for the secondary-side direct-current output voltage in response to a level of the secondary-side direct-current output voltage.

The switching power supply circuit may be configured such that a tertiary winding is provided on the primary side of the isolating converter transformer and serves as the voltage generation means, the power factor improving rectification means including a transformer having a primary winding which serves as the first inductance and a secondary winding which serves as the second inductance, the tertiary winding of the isolating converter transformer being connected to a node between the high speed recovery type diodes, the active clamp means clamping the switching output voltage obtained by the primary-side resonance circuit, the high speed recovery type diodes switching the rectification current on and off based on the voltage obtained by the voltage generation means.

As an alternative, the switching power supply circuit may be configured such that the power factor improving rectification means includes a transformer having a primary winding, a secondary winding which serves as the first inductance and a tertiary winding which serves as the second inductance, the primary winding of the transformer being connected in series to the primary winding of the isolating converter transformer and serving as the voltage generation means, the active clamp means clamping the switching output voltage obtained by the primary-side resonance circuit, the high speed recovery type diodes switching the rectification current on and off based on the voltage obtained by the voltage generation means.

As another alternative, the switching power supply circuit may be configured such that the power factor improving rectification means includes a transformer including a primary winding which serves as the first inductance and a secondary winding which services as a second inductance and a capacitor connected in parallel to the primary winding of the transformer to form a parallel circuit, the clamp capacitor of the active clamp means being connected to a node between one of the high speed recovery type diodes and the parallel circuit, the high speed recovery type diodes switching the rectification current on and off based on the voltage obtained by the voltage generation means to improve the power factor.

With the power supply circuits called a switching frequency control composite resonance type converter, a voltage based on a switching output voltage (voltage resonance pulse voltage) generated in the primary side voltage resonance converter (primary-side resonance circuit) is fed back to the smoothing capacitor through the power factor improving means or the power factor improving rectification means to increase the conduction angle of the alternating-current input current thereby to improve the power factor.

In this instance, the voltage resonance pulse voltage clamped by the active clamp means formed on the primary side is fed back to the power factor improving means or the power factor improving rectification means. Consequently, the switching control range is increased and a stabilized power factor characteristic can be achieved.

Or else, the voltage fed back to the power factor improving means or the power factor improving rectification means based on the voltage resonance pulse voltage is a pulse voltage generated in the active clamp means formed on the primary side. Consequently, the switching control range is increased and a stabilized power factor characteristic can be achieved.

Further, the power factor improving means or the power factor improving rectification means can eliminate the necessity for a series resonance capacitor.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 14 and 15 are diagrams illustrating different characteristics of the power factor and the direct-current input voltage of the switching power supply circuit of FIG. 12;

DETAILED DESCRIPTION OF THE PREFERRED EMBODIMENTS

First Embodiment

Figure 1:
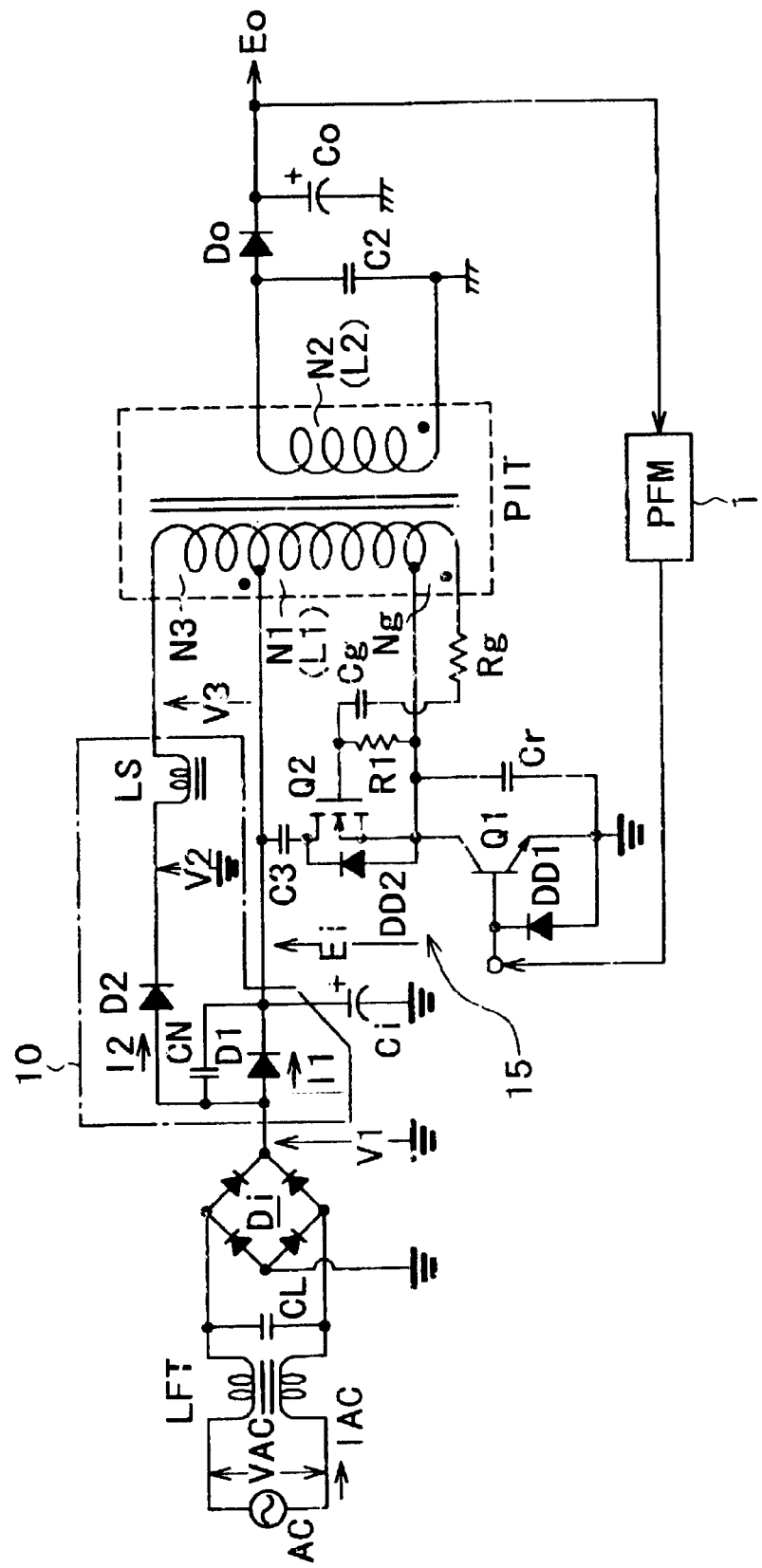
FIG. 1 is a circuit diagram of a switching power supply circuit to which the present invention is applied.

FIG. 1 shows a configuration of a switching power supply circuit to which the present invention is applied.

Referring to FIG. 1, the power supply circuit shown includes a switching converter of the voltage resonance type (a voltage resonance type converter) provided on the primary side. A power factor improving circuit 10 is provided for the voltage resonance type converter.

In the power supply circuit, a line filter transformer LFT and an across-the-line capacitor cl are provided for a commercial alternating-current power AC and form a line filter.

The power supply circuit further includes a bridge rectifier circuit Di for full-wave rectifying the commercial alternating-current power AC. A full-wave rectification output of the bridge rectifier circuit Di is charged into a smoothing capacitor Ci through the power factor improving circuit 10, and a rectified and smoothed voltage Ei is obtained across the smoothing capacitor Ci.

Before a configuration of the power factor improving circuit 10 is described, a configuration of the voltage resonance type converter is described first.

The voltage resonance type converter includes a single switching element Q1. A bipolar transistor (BJT; transistor of the junction type) having a high voltage resisting property is adopted as the switching element Q1.

A clamp diode DD1 is interposed between the base of the switching element Q1 and the negative electrode (primary-side ground) of the smoothing capacitor Ci so as to form a path for clamp circuit which flows when the switching element Q1 is off.

The collector of the switching element Q1 is connected to the positive terminal of the smoothing capacitor Ci through the primary winding N1 of an isolating converter transformer PIT. The emitter of the switching element Q1 is connected to a ground on the primary side.

The switching element Q1 performs a switching operation having a switching frequency which is varied with control current applied from a control circuit 1 to the base of the switching element Q1.

A parallel resonance capacitor Cr is connected between the collector and the emitter of the switching element Q1.

The parallel resonance capacitor Cr has a capacitance which cooperates with a leakage inductance L1 of the primary winding N1 side of the isolating converter transformer PIT to form a primary-side parallel resonant circuit of the voltage resonance type converter. When the switching element Q1 is off, the voltage across the parallel resonance capacitor Cr actually exhibits a pulse waveform of a sine wave due to an action of the parallel resonant circuit, and consequently, operation of the voltage resonance type is obtained.

Figure 2:
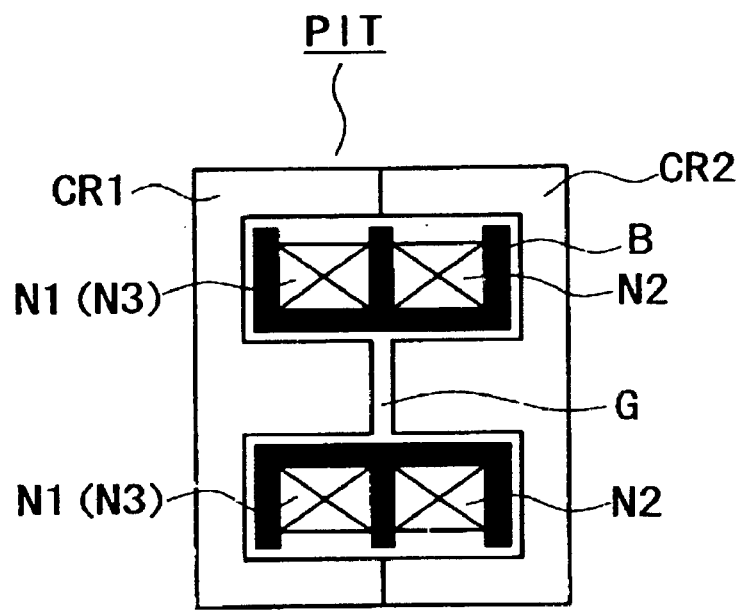
FIG. 2 is a schematic view showing a structure of an isolating converter transformer of the switching power supply circuit of FIG. 1.

Referring now to FIG. 2, the isolating converter transformer PIT includes an EE type core including E-type cores CR1 and CR2, for example, of a ferrite material combined such that the magnetic legs thereof are opposed to each other, and the primary winding N1 (and a tertiary winding N3) and the secondary winding N2 are wound in a divided state around the central magnetic leg of the EE type core using a divided bobbin B. The central magnetic leg has a gap G formed therein as seen in FIG. 2 so that loose coupling of a required coupling coefficient may be obtained.

The gap G can be formed by forming the central magnetic legs of the E-type cores CR1 and CR2 shorter than the two outer magnetic legs of each of the E-type cores CR1 and CR2. Further, the coupling coefficient k is selected to be, for example, k≈0.85 so as to obtain a loose coupling state thereby to make it difficult to reach a saturation state as much.

An end of the primary winding N1 of the isolating converter transformer PIT is connected to the collector of the switching element Q1 while the other end of the primary winding N1 is connected to the positive terminal (rectified and smoothed voltage Ei) of the smoothing capacitor Ci.

The tertiary winding N3 is formed on the primary side of the isolating converter transformer PIT. In this instance, if a center tap is provided on the primary side to form the primary winding N1 and the tertiary winding N3 or also a drive winding Ng which is hereinafter described is connected to a center tap, then production of the isolating converter transformer PIT is facilitated.

Referring back to FIG. 1, on the secondary side of the isolating converter transformer PIT, an alternating voltage induced in the primary winding N1 is generated in the secondary winding N2. In this instance, the secondary side parallel resonant capacitor C2 is connected in parallel to the secondary winding N2, and thus, a parallel resonant circuit is formed from a leakage inductance L2 of the secondary winding N2 and a capacitance of the secondary side parallel resonant capacitor C2. By the parallel resonant circuit, the alternating voltage induced in the secondary winding N2 becomes a resonance voltage. In other words, a voltage resonance operation is obtained on the secondary side. Thus, the power supply circuit is formed as a composite resonance type switching converter wherein a parallel resonant circuit for making the switching operation a switching operation of the voltage resonance type is provided on the primary side while another parallel resonant circuit for obtaining a voltage resonance operation is provided also on the secondary side.

In this instance, a rectification diode Do and a smoothing capacitor Co are connected in such a manner as seen in FIG. 1 to the secondary parallel resonant circuit formed in such a manner as described above to form a half-wave rectifying smoothing circuit, which produces a direct-current output voltage Eo.

Further, the power supply circuit includes the control circuit 1 serving as a PFM (Pulse Frequency Modulation circuit), and the direct-current output voltage Eo is inputted also to the control circuit 1 along a branch route. The control circuit 1 utilizes the direct-current output voltage Eo as a detection voltage to control the resonance frequency for switching of the switching element Q1 to perform constant voltage control. In particular, the control circuit 1 supplies a current signal whose frequency is varied, for example, in response to the level of the direct-current output voltage Eo of the secondary side to the base of the switching element Q1.

In other words, the control circuit 1 performs operation of varying the switching frequency of the switching element Q1 of the primary side in response to the level of the direct-current output voltage Eo of the secondary side thereby to obtain an action of stabilizing the direct-current output voltage Eo of the secondary side.

In the switching frequency control, when the secondary side output voltage rises as a result of the fact that, for example, the load is inclined to decrease, the switching frequency is raised to suppress the secondary side output.

The power supply circuit further includes an active clamp circuit 15 provided on the primary side.

The active clamp circuit 15 includes an auxiliary switching element Q2 in the form of a MOS-FET, a clamp capacitor C3, and a clamp diode DD2 in the form of a body diode. Further, the power supply circuit includes a driving circuit system for driving the auxiliary switching element Q2. The driving circuit system includes a drive winding Ng, a capacitor Cg, and resistors Rg and R1.

The clamp diode DD2 is connected in parallel between the drain and the source of the auxiliary switching element Q2. More particularly, the anode of the clamp diode DD2 is connected to the source of the auxiliary switching element Q2, and the cathode of the clamp diode DD2 is connected to the drain of the auxiliary switching element Q2.

The drain of the auxiliary switching element Q2 is connected to the positive electrode side of the smoothing capacitor Ci through the clamp capacitor C3. The source of the auxiliary switching element Q2 is connected to a collector point of the switching element Q1.

Accordingly, the active clamp circuit 15 is configured such that the clamp capacitor C3 is connected in series to the parallel connection circuit of the auxiliary switching element Q2 and the clamp diode DD2. The circuit formed in this manner is further connected in parallel to the primary winding N1 of the isolating converter transformer PIT.

In the driving circuit system for the auxiliary switching element Q2, the series connection circuit of the capacitor Cg, register Rg and drive winding Ng is connected to the gate of the auxiliary switching element Q2 as seen in FIG. 1. The series connection circuit forms a self-excited driving circuit for the auxiliary switching element Q2. Thus, a signal voltage from the self-excited driving circuit is applied to the gate of the auxiliary switching element Q2 so that a switching operation of the auxiliary switching element Q2 is performed.

In this instance, the drive winding Ng is formed on the winding starting side of the primary winding N1 and has, for example, 1 T (turn) as a turn number.

Consequently, a voltage is generated in the drive winding Ng in response to an alternating voltage obtained by the primary winding N1. Further, in this instance, voltages of the opposite polarities are obtained by the primary winding N1 and the drive winding Ng due to the winding directions of the primary winding N1 and the drive winding Ng.

Accordingly, the switching element Q1 and the auxiliary switching element Q2 are switched on/off alternately, and a voltage resonance pulse voltage is clamped by the active clamp circuit 15.

Figure 3:
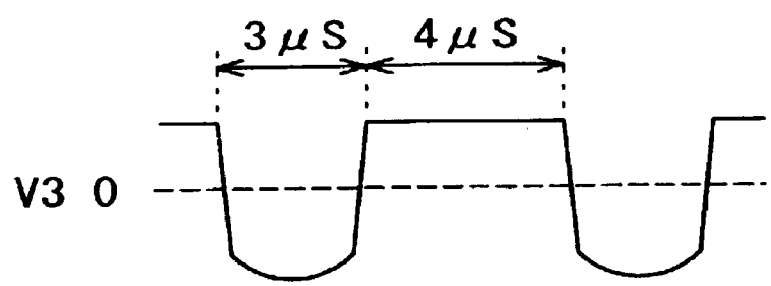
FIG. 3 is a waveform diagram showing a clamped feedback voltage waveform in the switching power supply circuit of FIG. 1 and FIG. 8.

While the tertiary winding N3 of the isolating converter transformer PIT functions as a feedback winding to the power factor improving circuit 10, the high frequency pulse voltage (voltage V3) fed back through the tertiary winding N3 has such a waveform as seen in FIG. 3 due to the clamping action of the active clamp circuit 15.

Now, a configuration of the power factor improving circuit 10 is described.

The power factor improving circuit 10 includes a filter capacitor CN for a normal mode filter, a low speed recovery type diode D1, a high speed recovery type diode D2 and an inductance Ls.

More particularly, in the power factor improving circuit 10, the low speed recovery type diode D1 is connected in series between the bridge rectifier circuit Di and the positive terminal of the smoothing capacitor Ci.

Further, the filter capacitor CN for a normal mode filter is connected in parallel to the low speed recovery type diode D1.

Further, the cathode of the high speed recovery type diode D2 is connected in series to the inductance Ls, which is in turn connected to the tertiary winding N3 of the isolating converter transformer PIT. The other end of the tertiary winding N3 of the isolating converter transformer PIT, that is, a center tap point between the tertiary winding N3 and the primary winding N1, is connected to the positive electrode side of the smoothing capacitor Ci. Consequently, the series connection of the high speed recovery type diode D2, inductance Ls and tertiary winding N3 are connected in parallel to the low speed recovery type diode D1 and also to the filter capacitor CN for a normal mode filter.

The power factor improving circuit 10 has the following power factor improving function.

In the power factor improving circuit 10, rectification current from the bridge rectifier circuit Di flows as charging current to the smoothing capacitor Ci along two different paths. In particular, the paths include a first path along which current I1 flows through the low speed recovery type diode D1 and a second path along which current I2 flows as high frequency switching current through the high speed recovery type diode D2 and the inductance Ls.

Further, in the power factor improving circuit 10, a switching output obtained by the primary-side parallel resonant circuit, that is, a voltage resonance pulse voltage clamped by the active clamp circuit 15, is fed back through the tertiary winding N3 which functions as a feedback winding. In other words, a clamped voltage resonance pulse voltage obtained at the primary winding N1 is fed back to the high speed recovery type diode D2 connected in series to the primary winding N1 through the tertiary winding N3.

With the switching output fed back in this manner, an alternating voltage of the switching period is superposed on the current path of the current I2 which flows through the high speed recovery type diode D2 and the inductance Ls. Thus, by the superposed alternating voltage of the switching period, an operation for switching the rectification current on and off in the switching period is obtained at the high speed recovery type diode D2.

In particular, when the cathode voltage V2 of the high speed recovery type diode D2 is lower than the anode voltage, that is, the rectification voltage V1, the high speed recovery type diode D2 performs on/off operations. By the on/off operations, charging current to the smoothing capacitor Ci flows also within a period within which the rectification output voltage level V1 is lower than the voltage across the smoothing capacitor Ci.

As a result, the average waveform of the alternating-current input current is controlled so as to approach the waveform of the alternating-current input voltage to increase the conduction angle of the alternating-current input current thereby to achieve improvement in the power factor.

While the charging current to the smoothing capacitor Ci flows separately along the path provided by the low speed recovery type diode D1 and the path provided by the high speed recovery type diode D2 and the inductance Ls as described above, the low speed recovery type diode D1 conducts only when the alternating-current input voltage VAC has a value around positive and negative peak values. In other words, the charging current I1 flows only when the alternating-current input voltage VAC has a value around a peak value thereof. Therefore, the low speed recovery type diode D1 prevents excessively high charging current from flowing to the high speed recovery type diode D2 around positive and negative peak values of the alternating-current input voltage VAC. Consequently, the power loss of the high speed recovery type diode D2 decreases, and a higher efficiency can be achieved.

Accordingly, a diode having a comparatively small current capacity can be selectively used for the diodes D1 and D2. Further, reduction of heat generation may eliminate the necessity for a radiator plate, and reduction in scale of circuitry and reduction in cost can be anticipated thereby.

Figure 17:
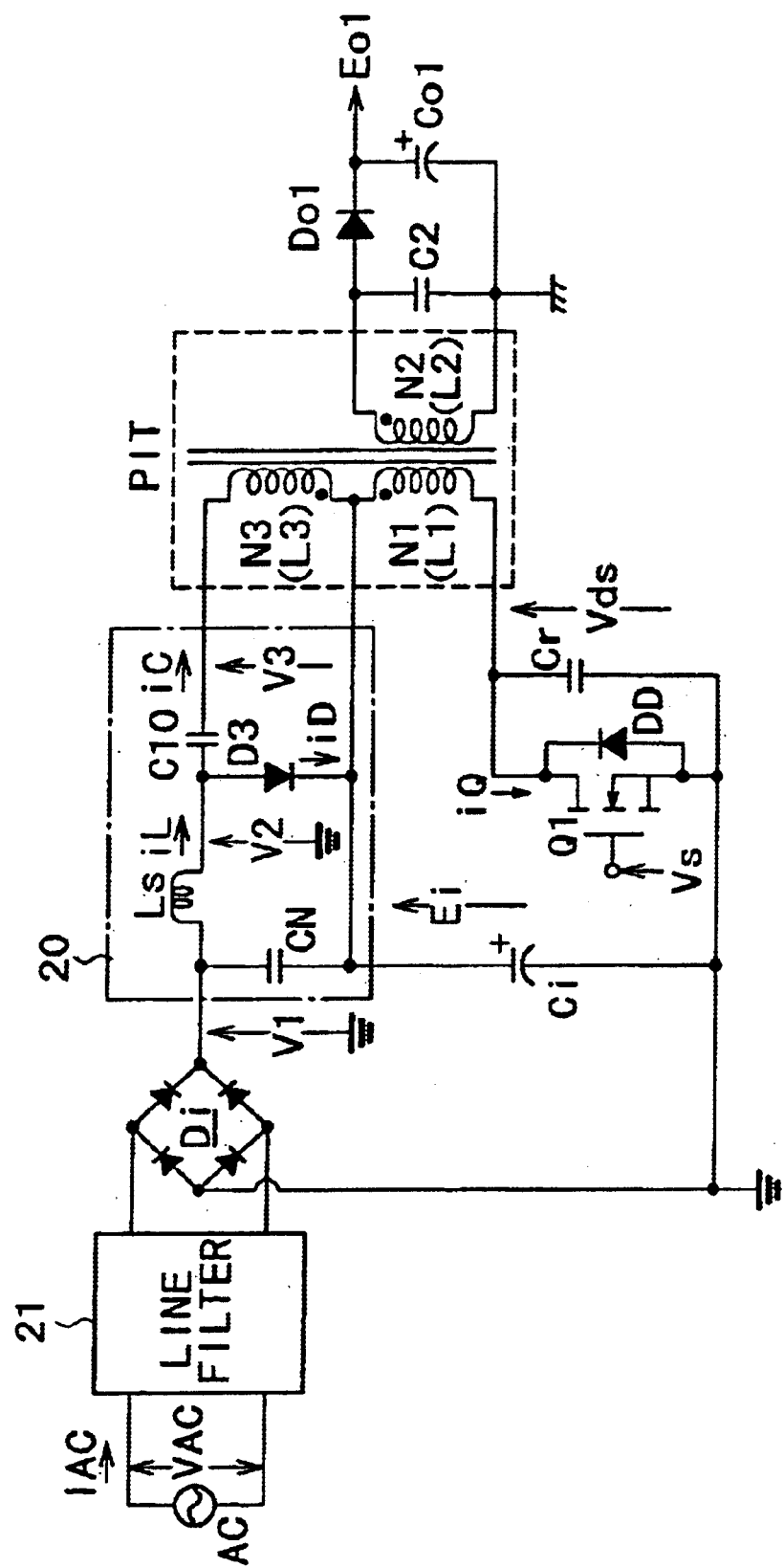
FIG. 17 is a circuit diagram showing a configuration of a conventional switching power supply circuit.
Figure 18:
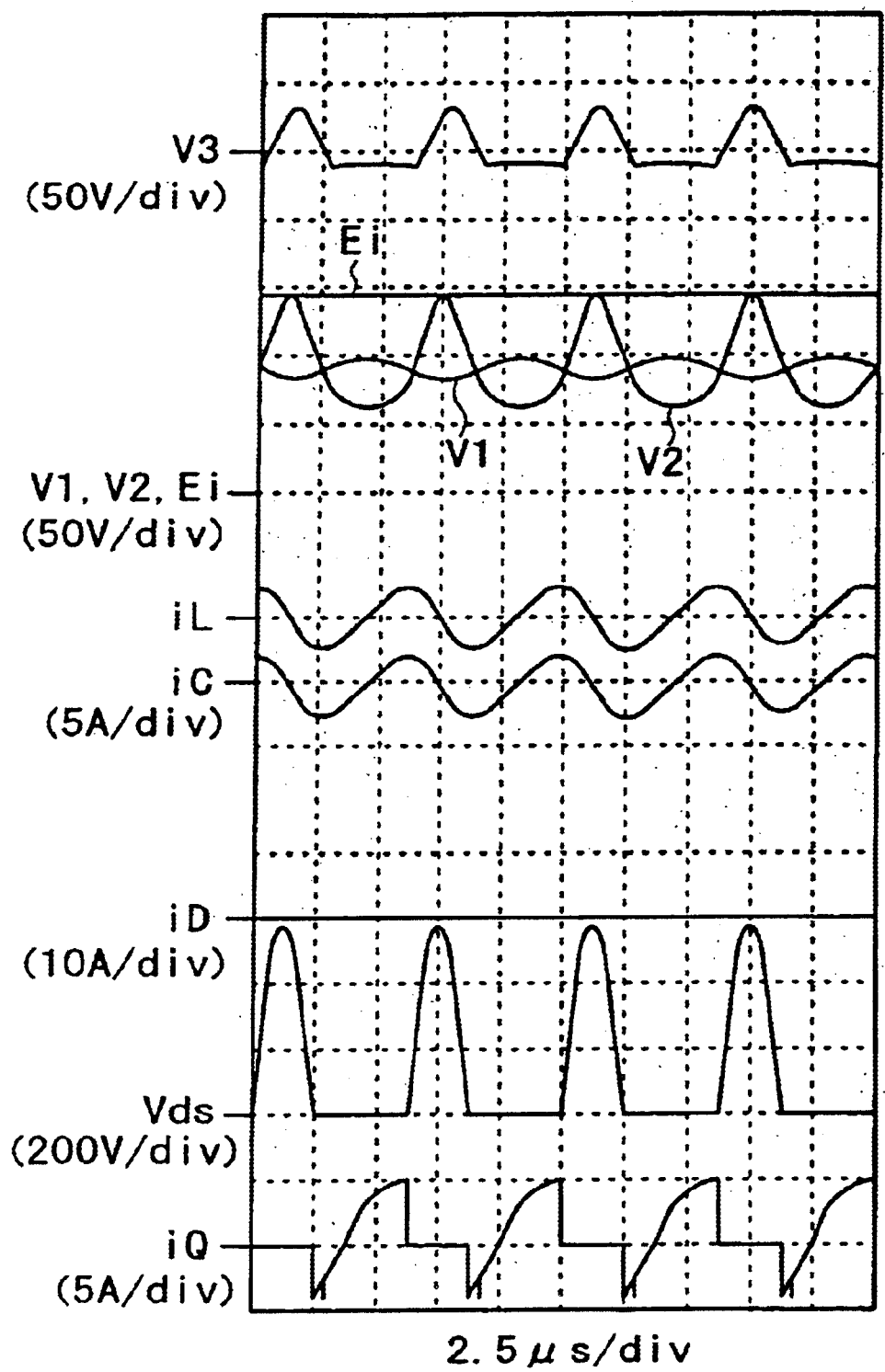
FIG. 18 is a waveform diagram illustrating operation of components of the conventional switching power supply circuit of FIG. 17.
Figure 19:
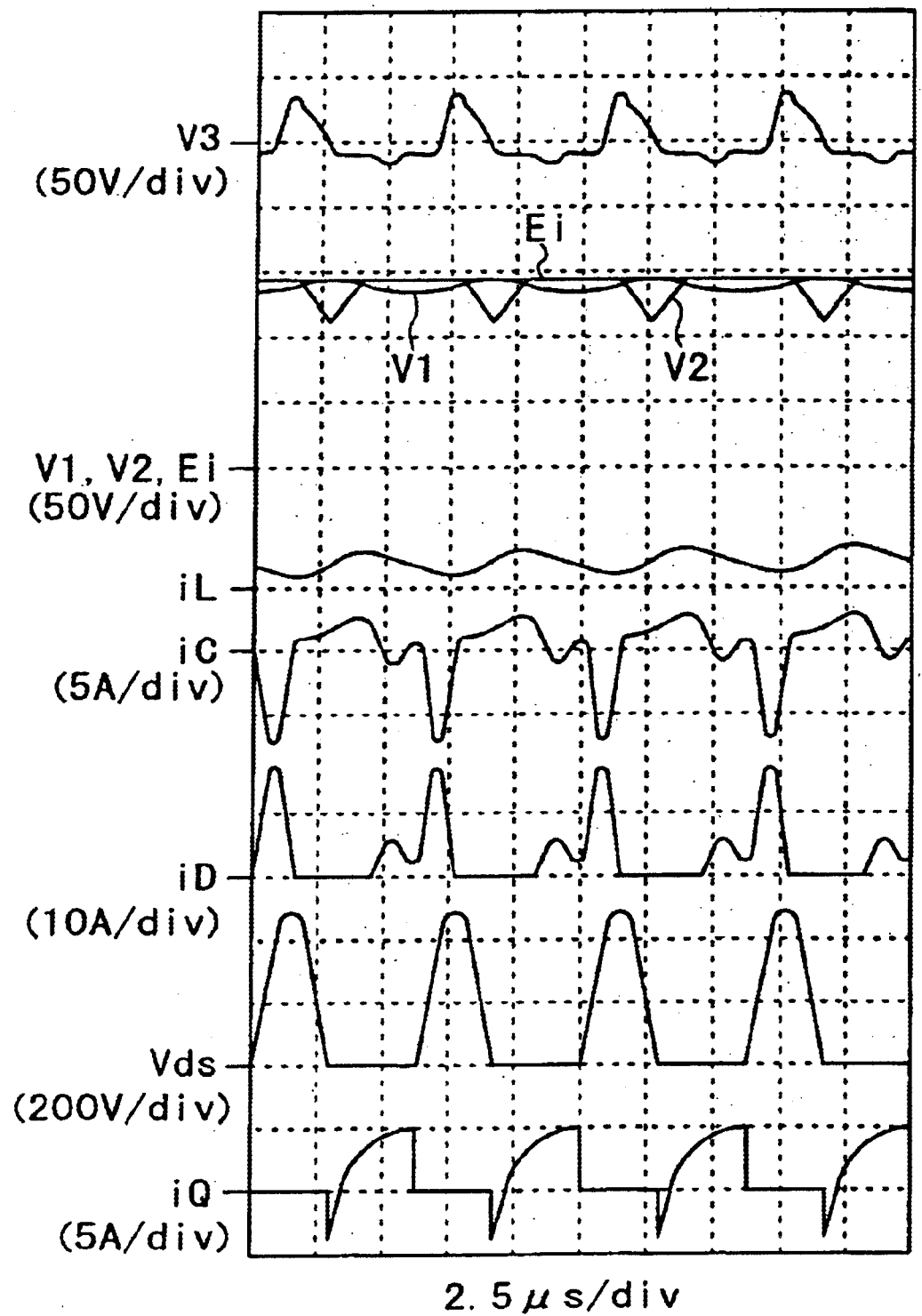
FIG. 19 is a waveform diagram illustrating different operation of components of the conventional switching power supply circuit of FIG. 17.
Figure 20:
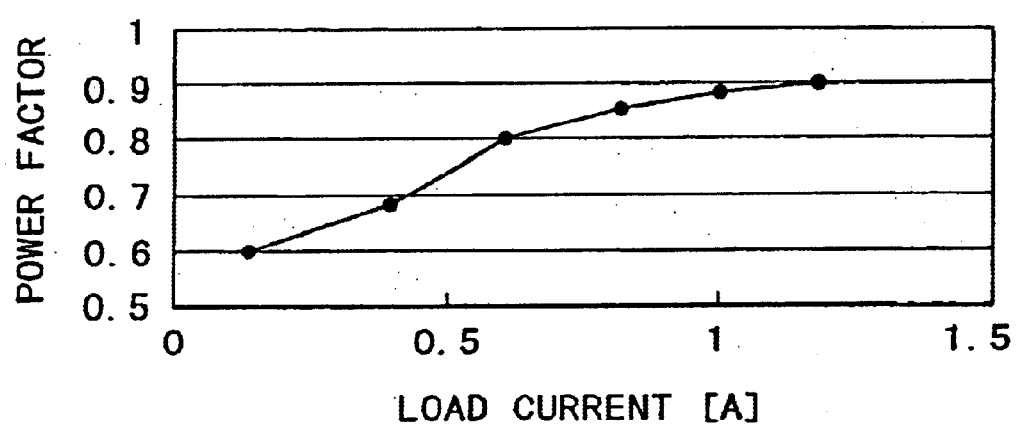
FIG. 20 is a diagram illustrating a characteristic of the power factor of the conventional switching power supply circuit of FIG. 17.

Further, in the power factor improving circuit 10, a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, as described hereinabove, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage illustrated in FIG. 3 is reduced is achieved, and this gives rise to another effect that the variation of the power factor is decreased.

Figure 4:
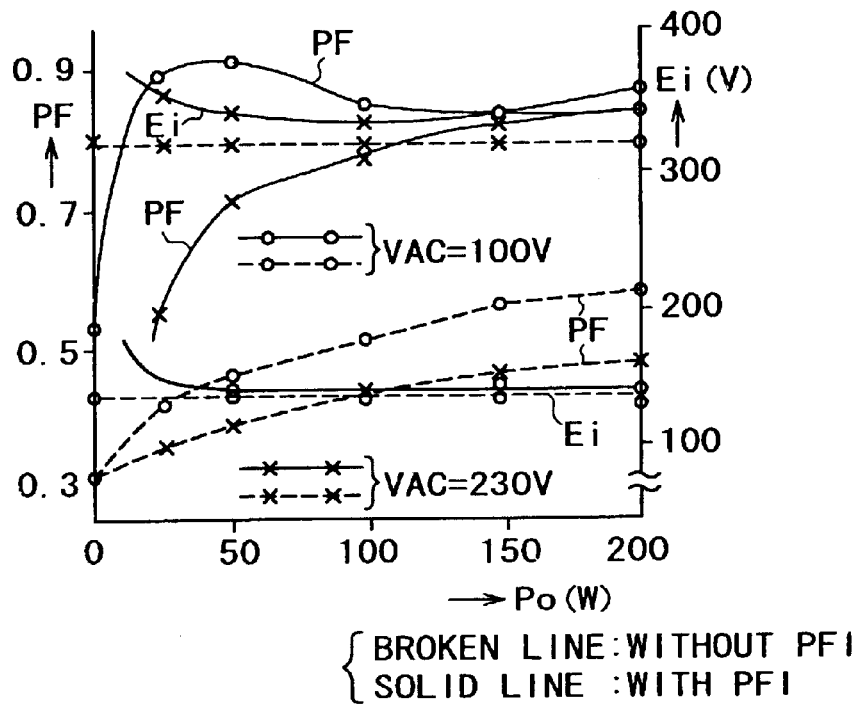
FIGS. 4 and 5 are diagrams illustrating different characteristics of the power factor and the direct-current input voltage of the switching power supply circuit of FIG. 1.
Figure 5:
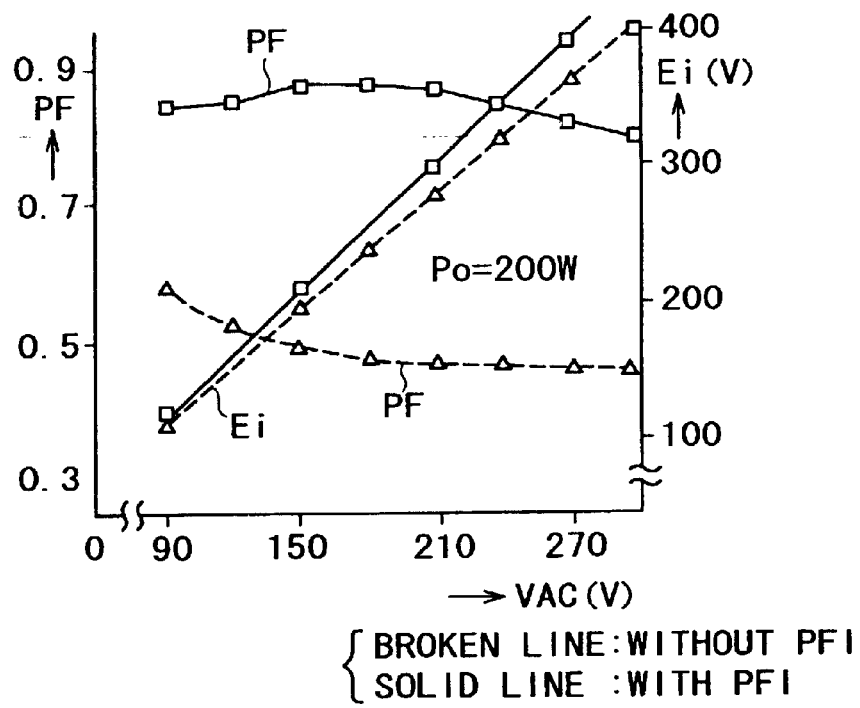

FIGS. 4 and 5 illustrate variation characteristics of the power factor PF and the direct-current input voltage Ei.

In particular, FIG. 4 illustrates the variation characteristics of the power factor PF and the direct-current input voltage Ei with respect to the variation of the load power Po from 0 to 200 W when the alternating-current input voltage VAC is 100 V, 50 Hz and when the alternating-current input voltage VAC is 230 V, 50 Hz.

Meanwhile, FIG. 5 illustrates the variation characteristics of the power factor PF and the direct-current input voltage Ei with respect to the variation of the alternating-current input voltage VAC from 90 to 288 V when the load power Po is 200 W.

In FIGS. 4 and 5, solid line curves represent characteristics where the power improving function (PFI) is involved, that is, characteristics of the circuit described hereinabove with reference to FIG. 1, and broken lines represent characteristics wherein no circuit configuration for improvement in power factor is involved.

Figure 6:
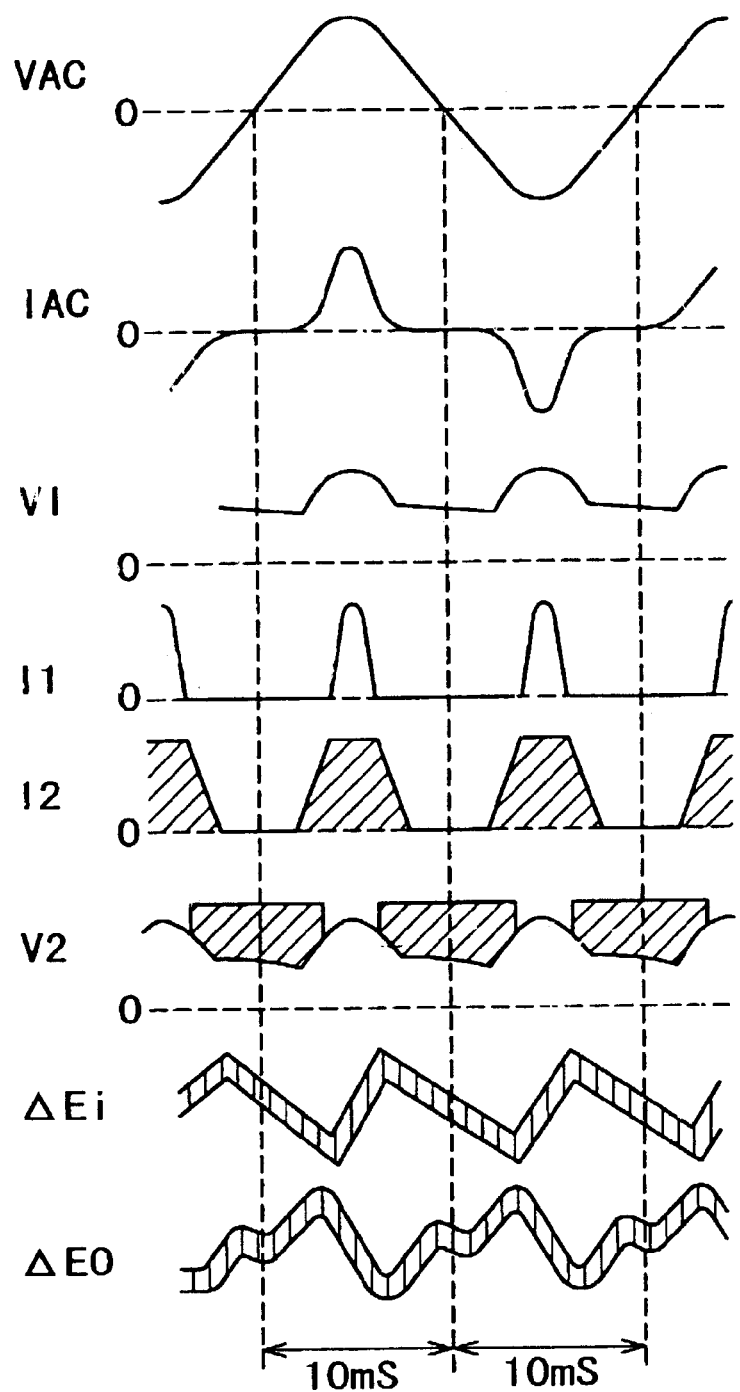
FIG. 6 is a waveform diagram illustrating operations of several components of the switching power supply circuit of FIG. 1.

FIG. 6 shows operation waveforms of several components of the circuit of FIG. 1 when the alternating-current input voltage VAC is 100 V or 230 V. Since the operation waveforms when the alternating-current input voltage VAC is 100 V and when the alternating-current input voltage VAC is 230 V are substantially similar to each other but are different only in absolute values, they are illustrated as common waveforms for convenience of illustration in FIG. 6.

FIG. 6 illustrates the waveforms of the alternating-current input voltage VAC, alternating-current input current IAC, rectification voltage V1, cathode voltage V2, current I1 which flows through the low speed recovery type diode D1, current I2 which flows through the high speed recovery type diode D2, a ripple voltage $\Delta$Ei of the direct-current input voltage Ei, and a ripple voltage $\Delta$Eo of the direct-current output voltage Eo.

In this instance, the circuit of FIG. 1 has the following constants:

primary winding N1 of the isolating converter transformer PIT=53 T tertiary winding N3 of the isolating converter transformer PIT=18 T primary-side parallel resonance capacitor Cr=3,300 pF clamp capacitor C3=0.047 $\mu$F filter capacitor CN=1 $\mu$F inductance Ls=68 $\mu$H As can be seen from FIG. 4, when the alternating-current input voltage VAC is 100 V, where the power factor improving circuit 10 is not provided, within a range of 50 W to 200 W of the load power Po, the power factor PF varies within a range from 0.46 to 0.57 and the direct-current input voltage Ei varies within a range from 138 V to 131 V. However, in the case of the circuit of FIG. 1 which includes the power factor improving circuit 10, the power factor PF varies within a range from 0.91 to 0.83 and the direct-current input voltage Ei varies within a range from 140 V to 133 V.

On the other hand, when the alternating-current input voltage VAC is 230 V, where power factor improving circuit 10 is not provided, within a range of 50 W to 200 W of the load power Po, the power factor PF varies within a range from 0.39 to 0.47 and the direct-current input voltage Ei varies within a range from 320 V to 319 V. However, in the case of the circuit of FIG. 1 which includes the power factor improving circuit 10, the power factor varies within a range from 0.71 to 0.84 and the direct-current input voltage Ei varies within a range from 346 V to 328 V.

Further, as can be seen from FIG. 5, in the case of the load power Po=200 W, when the alternating-current input voltage VAC varies from 90 V to 270 V, where the power factor improving circuit 10 is not provided, the power factor PF varies within a range from 0.58 to 0.45, but in the circuit of FIG. 1 which includes the power factor improving circuit 10, the power factor PF varies within a range from 0.87 to 0.81.

In short, a power factor PF of a characteristic which exhibits a comparatively small variation with respect to a great variation of the load power Po or the alternating-current input voltage VAC can be realized.

Meanwhile, the AC/DC power conversion efficiency ($\eta_{AC/DC}$) ranges, when the alternating-current input voltage VAC is 100 V and the load power Po ranges from 50 W to 200 W, from 88.8% to 90.8% where the power factor improving circuit 10 is not provided, but from 86.1% to 90.5% in the case of the circuit of FIG. 1 which includes the power factor improving circuit 10.

When the alternating-current input voltage VAC is 230 V and the load power Po ranges from 50 W to 200 W, the AC/DC power conversion efficiency ($\eta_{AC/DC}$) ranges from 87.1% to 92.0% where the power factor improving circuit 10 is not provided, but from 84.3% to 91.0% in the case of the circuit of FIG. 1 which includes the power factor improving circuit 10.

A manner wherein the charging current I1 and the charging current I2 flow separately along the path of the low speed recovery type diode D1 and the path of the high speed recovery type diode D2 as described above can be seen in FIG. 6.

In particular, around a peak of the alternating-current input voltage VAC, the current I1 of the waveform illustrated in FIG. 6 flows through the low speed recovery type diode D1, and therefore, the current I2 flowing through the high speed recovery type diode D2 is not high current.

Second Embodiment

Now, another switching power supply circuit to which the present invention is applied is described.

The present embodiment achieves an object similar to that of the first embodiment described above and besides achieves improvement of the AC/DC power conversion efficiency ($\eta_{AC/DC}$) where the alternating-current input voltage VAC is a voltage of the 100 V type.

Figure 7:
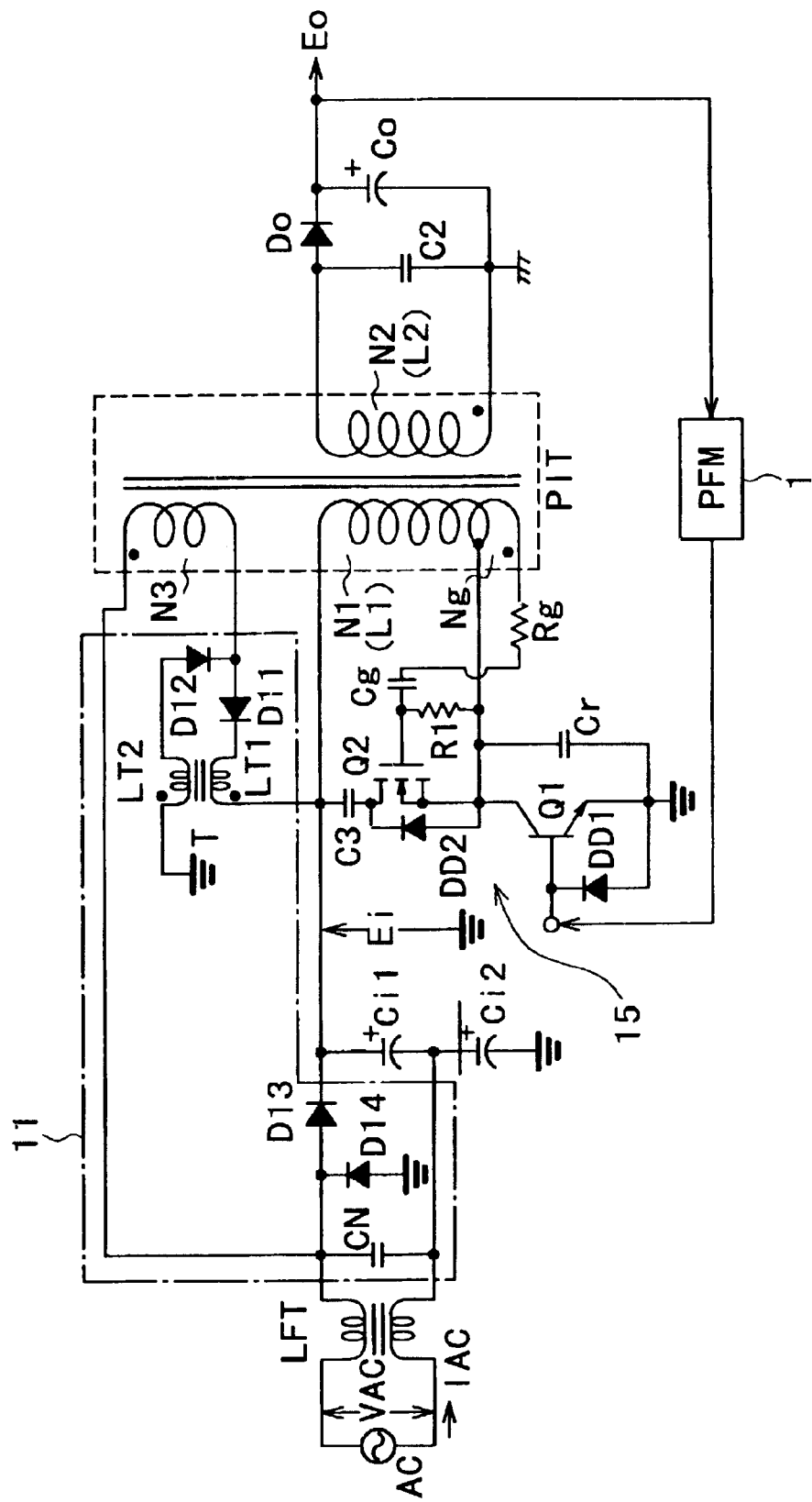
FIG. 7 is a circuit diagram of another switching power supply circuit to which the present invention is applied.

FIG. 7 shows the switching power supply circuit according to the second embodiment. It is to be noted that the same parts in FIG. 7 as that in FIG. 1 are denoted by the same reference characters in FIG. 1, and the detailed explanation therefor is omitted. The switching power supply circuit is different from the circuit of FIG. 1 principally in that it includes a voltage doubler rectifier circuit having a power factor improving function.

Referring to FIG. 7, the power supply circuit shown includes a switching converter of the voltage resonance type (a voltage resonance type converter) provided on the primary side. A rectification circuit having a power factor improving function, that is, a power factor rectification circuit 11, is provided for the voltage resonance type converter.

In the power supply circuit, alternating-current input current IAC from a commercial alternating-current power AC through a line filter transformer LFT is rectified by the power factor rectification circuit 11 and smoothed by two smoothing capacitors Ci1 and Ci2 connected in series to obtain a rectified and smoothed voltage Ei as high as twice a rectification smoothed voltage which can be obtained by a full-wave rectifier system, thereby forming a double voltage rectification system.

Before a configuration of the power factor rectification circuit 11 is described, a configuration of the voltage resonance type converter is described but simply because it is generally similar to that in the first embodiment.

Also the voltage resonance type converter in the power supply circuit of FIG. 7 includes a single switching element Q1, for example, in the form of a bipolar transistor having a high voltage resisting property.

Further, similarly as in the voltage resonance type converter in the power supply circuit of FIG. 1, a clamp diode DD1 is connected to the switching element Q1, a parallel resonance capacitor Cr and a primary winding N1 of an isolating converter transformer PIT cooperate with each other to form a primary-side parallel resonant circuit of the voltage resonance type converter through the capacitance of the parallel resonance capacitor Cr and the leakage inductance of the primary winding N1, and an active clamp circuit 15 is formed on the primary side and clamps the voltage resonance pulse voltage.

Furthermore, similarly as in the voltage resonance type converter in the power supply circuit of FIG. 1, a resonance capacitor C2 is connected in parallel to a secondary winding N2 of the isolating converter transformer PIT to form a resonance circuit also on the secondary side of the isolating converter transformer PIT so that the voltage resonance type converter is formed as a composite resonance converter, and rectification smoothing is performed by a rectification diode Do and a smoothing capacitor Co to obtain a direct-current output voltage Eo, and besides the switching frequency of the switching element Q1 is controlled by a control circuit 1 in the form of a PFM to stabilize the direct-current output voltage Eo on the secondary side.

It is to be noted that, while a tertiary winding N3 is wound on the primary side of the isolating converter transformer PIT, the tertiary winding N3 here is wound as a separate winding from the primary winding N1. The primary winding N1 and the drive winding Ng is connected to each other at a center tap.

Now, a configuration of the power factor rectification circuit 11 is described.

The power factor rectification circuit 11 has a rectification action for the alternating-current input current IAC and further has a power factor improving function for the alternating-current input current IAC. More particularly, a voltage feedback type power factor improving power supply is formed as a power supply of the voltage doubler rectifier system.

The power factor rectification circuit 11 includes a capacitor CN for normal mode noise suppression between ac lines.

The power factor rectification circuit 11 further includes two high speed recovery type diodes D11 and D12. The high speed recovery type diodes D11 and D12 are connected in series and interposed the positive terminal of a smoothing capacitor Ci1 and the primary-side ground through a transformer T.

In particular, a winding ending end of the primary winding (inductance LT1) of the transformer T is connected in series to the cathode of the high speed recovery type diode D11 while a winding starting end of the primary winding (LT1) is connected to the positive terminal of the smoothing capacitor Ci1. Further, a winding ending end of the secondary winding (inductance LT2) of the transformer T is connected in series to the anode of the high speed recovery type diode D12, and a winding starting end of the secondary winding (LT2) is connected to a ground on the primary side.

A winding ending end of the tertiary winding N3 of the isolating converter transformer PIT is connected to a node between the high speed recovery type diodes D11 and D12, and a winding starting end of the tertiary winding N3 is connected to one of the ac lines.

The power factor rectification circuit 11 further includes a series circuit of low speed recovery type diodes D13 and D14 connected to one of the ac lines.

The series circuit of the low speed recovery type diodes D13 and D14 is interposed between the positive terminal of the smoothing capacitor Ci1 and the primary-side ground.

The rectification function of the power factor rectification circuit 11 having the configuration described above is described below.

In the power factor rectification circuit 11, the high speed recovery type diodes D11 and D12 function as a first rectification circuit while the low speed recovery type diodes D13 and D14 function as a second rectification circuit.

In particular, within a period within which the alternating-current input voltage VAC is positive, rectification current from the first rectification circuit flows along a route of the alternating-current power supply AC→tertiary winding N3→high speed recovery type diode D11→inductance LT1→smoothing capacitor Ci1 to charge the smoothing capacitor Ci1. Simultaneously, rectification current from the second rectification circuit flows along another route of the alternating-current power supply AC→low speed recovery type diodes D13→smoothing capacitor Ci1 to charge the smoothing capacitor Ci1.

On the other hand, within another period within which the alternating-current input voltage VAC is negative, rectification current from the first rectification circuit flows along a route of the alternating-current power supply AC→the smoothing capacitor Ci2→primary-side ground inductance LT2→high speed recovery type diode D12 to charge the smoothing capacitor Ci2. Simultaneously, rectification current from the second rectification circuit flows along another route of the alternating-current power supply AC→smoothing capacitor Ci2→primary-side ground→low speed recovery type diode D14 to charge the smoothing capacitor Ci2.

In short, rectification current flows separately from the first and second rectification circuits along two routes to the smoothing capacitors Ci1 and Ci2.

Further, since the smoothing capacitors Ci1 and Ci2 are connected in series and the rectified and smoothed voltage Ei is extracted from the positive terminal side of the smoothing capacitor Ci1, a double voltage rectification system is achieved.

The power factor rectification circuit 11 has the following power factor improving function.

To the two high speed recovery type diodes D11 and D12 described above, a switching output (clamped voltage resonance pulse voltage) obtained by the primary-side parallel resonant circuit is fed back through the tertiary winding N3 of the isolating converter transformer PIT.

An alternating voltage of the switching period originating from the switching output fed back in this manner is superposed on the rectification current paths, and from the superposed alternating current of the switching period, an operation of switching the rectification current on and off in the switching period is obtained at the high speed recovery type diode D11 (or D12). By the switching on/off action, charging current to the smoothing capacitor Ci1 (or Ci2) flows also within a period within which the rectification output voltage level is lower than the voltage across the smoothing capacitor Ci1 (or Ci2).

As a result, the average waveform of the alternating-current input current is controlled so as to approach the waveform of the alternating-current input voltage to increase the conduction angle of the alternating-current input current thereby to achieve improvement in the power factor.

In the power factor rectification circuit 11, charging current to the smoothing capacitors Ci1 and Ci2 flows separately by the action of the first and second rectification circuits described above.

This prevents excessive charging current from flowing through the high speed recovery type diode D11 or D12 when the alternating-current input voltage VAC has a value around a positive or negative peak value. In particular, when the alternating-current input voltage VAC has a value around a positive or negative peak value, charging current flows to the low speed recovery type diodes D13 and D14 while only current of a high frequency flows to the high speed recovery type diodes D11 and D12. Therefore, the power loss of the high speed recovery type diodes D11 and D12 decreases and a high efficiency can be obtained. Consequently, the AC/DC power conversion efficiency ($\eta_{AC/DC}$) can be improved when compared with that of the circuit of FIG. 1.

Further, a diode having a comparative small current capacity can be selectively used for the high speed recovery type diodes D11 and D12. Furthermore, reduction of heat generation may eliminate the necessity for a radiator plate. Consequently, reduction in scale of circuitry and reduction in cost can be anticipated thereby.

Also in the power supply circuit of FIG. 7, the power factor improving circuit 11 is configured such that a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage is reduced is achieved, and this gives rise to another effect that the variation of the power factor is decreased.

Third Embodiment

Figure 8:
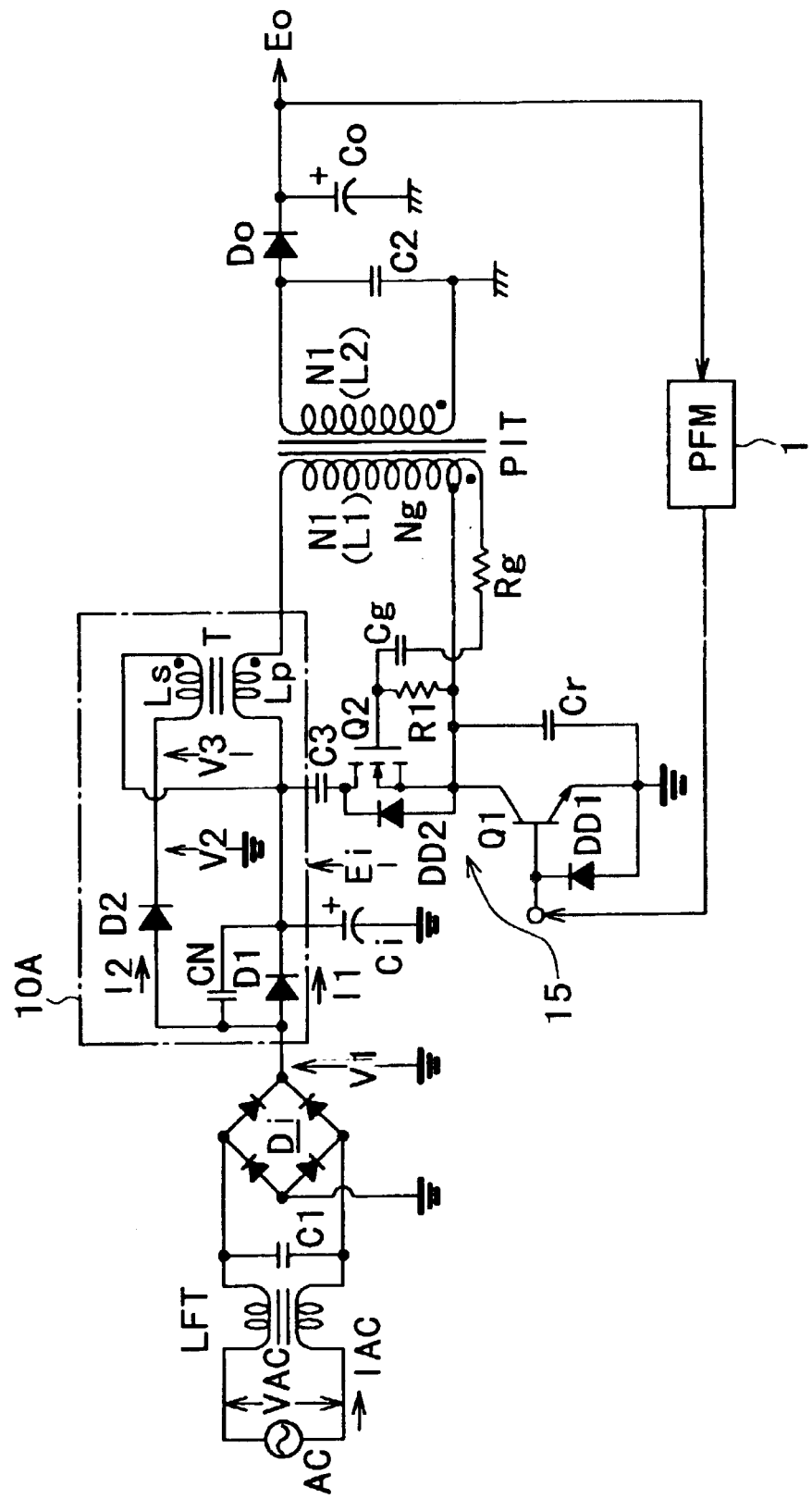
FIG. 8 is a circuit diagram of a further switching power supply circuit to which the present invention is applied.

FIG. 8 shows a configuration of a further switching power supply circuit to which the present invention is applied.

Referring to FIG. 8, the power supply circuit shown includes a switching converter of the voltage resonance type (a voltage resonance type converter) provided on the primary side. A power factor improving circuit 10A is provided for the voltage resonance type converter. It is to be noted that the same parts in FIG. 8 as that in FIG. 1 are denoted by the same reference characters in FIG. 1.

Referring to FIG. 8, the power supply circuit shown includes a line filter transformer LFT and an across-the-line capacitor cl provided for a commercial alternating-current power AC and forming a line filter and a bridge rectifier circuit Di for full-wave rectifying the commercial alternating-current power AC in a similar manner as in the power supply circuit of FIG. 1. A rectification output from the bridge rectifier circuit Di is charged to a smoothing capacitor Ci through the power factor rectification circuit 10A, and a rectified and smoothed voltage Ei is obtained across the smoothing capacitor Ci.

Also the voltage resonance type converter which includes a switching element Q1 in the form of a bipolar transistor having a high voltage resisting property has a similar configuration to that in FIG. 1.

In particular, a clamp diode DD1 is interposed between the base of the switching element Q1 and the negative electrode (primary-side ground) of the smoothing capacitor Ci. The emitter of the switching element Q1 is connected to a ground on the primary side.

The collector of the switching element Q1 is connected to the positive terminal of the smoothing capacitor Ci through the primary winding N1 of an isolating converter transformer PIT and a primary winding (inductance Lp) of a transformer T.

The switching element Q1 performs a switching operation having a switching frequency which is varied with control current applied from a control circuit 1 to the base of the switching element Q1.

Similarly as in the circuit of FIG. 1, a parallel resonance capacitor Cr is connected between the collector and the emitter of the switching element Q1. The parallel resonance capacitor Cr has a capacitance which cooperates with a leakage inductance L1 of the primary winding N1 side of the isolating converter transformer PIT to form a primary-side parallel resonant circuit of the voltage resonance type converter. When the switching element Q1 is off, the voltage across the parallel resonance capacitor Cr exhibits a pulse waveform of a sine wave due to an action of the parallel resonant circuit, and consequently, operation of the voltage resonance type is obtained.

The isolating converter transformer PIT has a structure described hereinabove with reference to FIG. 2. In particular, the primary winding N1 and the secondary winding N2 are wound in a divided state around the central magnetic leg having a gap G formed therein so that loose coupling of a coupling coefficient of, for example, k≈0.85 may be obtained thereby to make it difficult to reach a saturation state as much.

An end of the primary winding N1 of the isolating converter transformer PIT is connected to the collector of the switching element Q1 while the other end of the primary winding N1 is connected to the positive terminal (rectified and smoothed voltage Ei) of the smoothing capacitor Ci through the primary winding (inductance Lp) of the transformer T.

A drive winding Ng is formed through a center tap connection on the primary side of the isolating converter transformer PIT.

It is to be noted that, in the circuit of FIG. 8, different from the circuit shown in FIG. 1, no tertiary winding N3 is formed on the primary side.

Similarly as in the voltage resonance type converter in the power supply circuit of FIG. 1, a resonance capacitor C2 is connected in parallel to a secondary winding N2 of the isolating converter transformer PIT to form a resonance circuit also on the secondary side of the isolating converter transformer PIT so that the voltage resonance type converter is formed as a composite resonance converter, and rectification smoothing is performed by a rectification diode Do and a smoothing capacitor Co to obtain a direct-current output voltage Eo, and besides the switching frequency of the switching element Q1 is controlled by the control circuit 1 in the form of a PFM to stabilize the direct-current output voltage Eo on the secondary side.

Also the present power supply circuit includes an active clamp circuit 15 provided on the primary side.

The active clamp circuit 15 includes an auxiliary switching element Q2 in the form of a. MOS-FET, a clamp capacitor C3, and a clamp diode DD2 in the form of a body diode. Further, the power supply circuit includes a driving circuit system for driving the auxiliary switching element Q2. The driving circuit system includes a drive winding Ng, a capacitor Cg, and resistors Rg and R1.

The clamp diode DD2 is connected in parallel between the drain and the source of the auxiliary switching element Q2. More particularly, the anode of the clamp diode DD2 is connected to the source of the auxiliary switching element Q2, and the cathode of the clamp diode DD2 is connected to the drain of the auxiliary switching element Q2.

The drain of the auxiliary switching element Q2 is connected to the positive electrode side of the smoothing capacitor Ci through the clamp capacitor C3. The source of the auxiliary switching element Q2 is connected to a collector point of the switching element Q1.

Accordingly, the active clamp circuit 15 is configured such that the clamp capacitor C3 is connected in series to the parallel connection circuit of the auxiliary switching element Q2 and the clamp diode DD2. The circuit formed in this manner is further connected in parallel to the primary winding N1 of the isolating converter transformer PIT.

In the driving circuit system for the auxiliary switching element Q2, the series connection circuit of the capacitor Cg, register Rg and drive winding Ng is connected to the gate of the auxiliary switching element Q2 as seen in FIG. 8. The series connection circuit forms a self-excited driving circuit for the auxiliary switching element Q2. Thus, a signal voltage from the self-excited driving circuit is applied to the gate of the auxiliary switching element Q2 so that a switching operation of the auxiliary switching element Q2 is performed.

In this instance, the drive winding Ng is formed on the winding starting side of the primary winding N1 and has, for example, 1 T (turn) as a turn number.

Consequently, a voltage is generated in the drive winding Ng in response to an alternating voltage obtained by the primary winding N1. Further, in this instance, voltages of the opposite polarities are obtained by the primary winding N1 and the drive winding Ng due to the winding directions of the primary winding N1 and the drive winding Ng.

Accordingly, the switching element Q1 and the auxiliary switching element Q2 are switched on/off alternately, and a voltage resonance pulse voltage is clamped by the active clamp circuit 15.

While the primary winding (inductance Lp) of the transformer T functions as a feedback winding to the power factor improving circuit 10A, the high frequency pulse voltage waveform (voltage V3) fed back through the transformer T has a waveform similar to that shown in FIG. 3 due to the clamping action of the active clamp circuit 15.

Now, a configuration of the power factor improving circuit 10A is described.

The power factor improving circuit 10A includes a filter capacitor CN for a normal mode filter, a low speed recovery type diode D1, a high speed recovery type diode D2 and the transformer T.

More particularly, in the power factor improving circuit 10A, the low speed recovery type diode D1 is connected in series between the bridge rectifier circuit Di and the positive terminal of the smoothing capacitor Ci.

Further, the capacitor CN for a normal mode filter is connected in parallel to the low speed recovery type diode D1.

Further, the cathode of the high speed recovery type diode D2 is connected to a winding ending end of the secondary winding (inductance Ls) of the transformer T, and a winding starting end of the secondary winding (Ls) of the transformer T is connected to the positive electrode side of the smoothing capacitor Ci. Consequently, the series connection of the high speed recovery type diode D2 and the inductance Ls is connected in parallel to the low speed recovery type diode D1 and also to the capacitor CN for a normal mode filter.

The primary winding (inductance Lp) of the transformer T is connected to the winding ending end of the primary winding N1 of the isolating converter transformer PIT while the winding starting end of the primary winding (inductance Lp) of the transformer T is connected to the positive electrode of the smoothing capacitor Ci.

In the transformer T having such a connection scheme of the primary winding (Lp) and the secondary winding (Ls) as described above, the winding ending end of the primary winding (Lp) and the winding starting end of the secondary winding (Ls) are connected to each other. Therefore, actually the primary winding (Lp) and the secondary winding (Ls) can be connected to each other by a center tap connection. From this, the transformer T can be formed using a drum type magnetic core of ferrite of open magnetic circuit of a small size, and facilitation in manufacture and miniaturization of the circuit can be realized.

The power factor improving circuit 10A has the following power factor improving function.

In the power factor improving circuit 10A, rectification current from the bridge rectifier circuit Di flows as charging current to the smoothing capacitor Ci along two different paths including a first path along which current I1 flows through the low speed recovery type diode D1 and a second path along which current I2 flows as high frequency switching current through the high speed recovery type diode D2 and the inductance Ls.

Further, a switching output obtained by the primary-side parallel resonant circuit and flowing through the primary winding (Lp) of the transformer T, that is, a voltage resonance pulse voltage clamped by the active clamp circuit 15, is fed back to the power factor improving circuit 10A. In other words, an induced voltage is generated in the secondary winding (Ls) by primary current flowing through the primary winding (Lp), and a voltage resonance pulse voltage clamped thereby is fed back to the high speed recovery type diode D2 connected in series to the secondary winding (Ls).

With the switching output fed back in this manner, an alternating voltage of the switching period is superposed on the current path of the current I2 which flows through the high speed recovery type diode D2 and the inductance Ls. Thus, by the superposed alternating voltage of the switching period, an operation for switching the rectification current on and off in the switching period is obtained at the high speed recovery type diode D2.

In particular, when the cathode voltage V2 of the high speed recovery type diode D2 is lower than the anode voltage, that is, the rectification voltage V1, the high speed recovery type diode D2 performs on/off operations. By the on/off operations, charging current to the smoothing capacitor Ci flows also within a period within which the rectification output voltage level V1 is lower than the voltage across the smoothing capacitor Ci.

As a result, the average waveform of the alternating-current input current is controlled so as to approach the waveform of the alternating-current input voltage to increase the conduction angle of the alternating-current input current thereby to achieve improvement in the power factor.

While the charging current to the smoothing capacitor Ci flows separately along the path provided by the low speed recovery type diode D1 and the path provided by the high speed recovery type diode D2 and the inductance Ls as described above, the low speed recovery type diode D1 conducts only when the alternating-current input voltage VAC has a value around positive and negative peak values. In other words, the charging current I1 flows only when the alternating-current input voltage VAC has a value around a peak value thereof. Therefore, the low speed recovery type diode D1 prevents excessively high charging current from flowing to the high speed recovery type diode D2 around positive and negative peak values of the alternating-current input voltage VAC. Consequently, the power loss of the high speed recovery type diode D2 decreases, and a higher efficiency can be achieved.

Accordingly, a diode having a comparative small current capacity can be selectively used for the diodes D1 and D2. Further, reduction of heat generation may eliminate the necessity for a radiator plate, and reduction in scale of circuitry and reduction in cost can be anticipated thereby.

Further, in the power factor improving circuit 10A, a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, as described hereinabove, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage illustrated in FIG. 3 is reduced is achieved, and this gives rise to another effect that the variation of the power factor is decreased.

Figure 9:
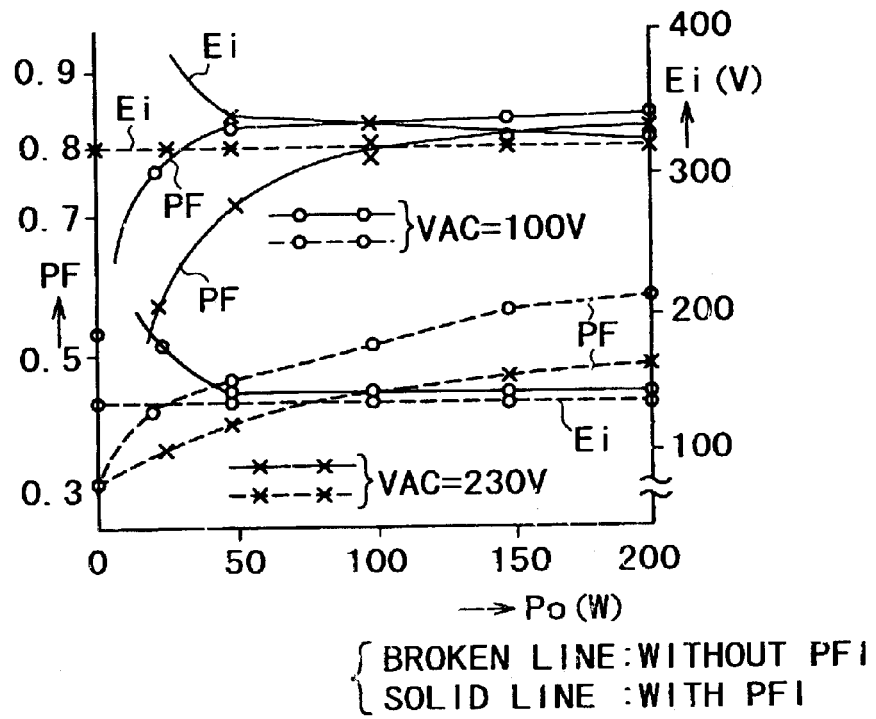
FIGS. 9 and 10 are diagrams illustrating different characteristics of the power factor and the direct-current input voltage of the switching power supply circuit of FIG. 8.
Figure 10:
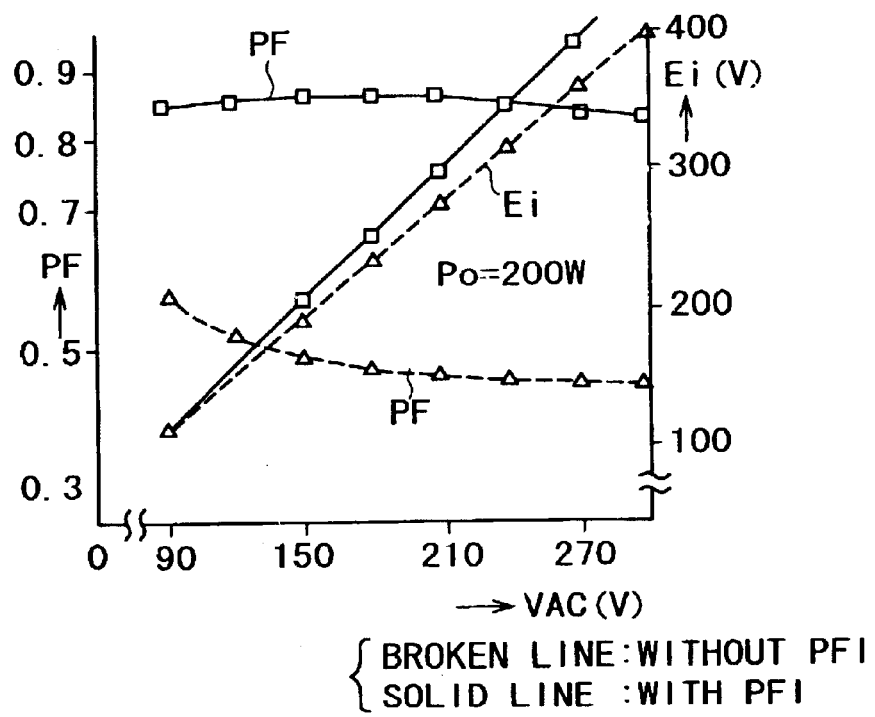

FIGS. 9 and 10 illustrate variation characteristics of the power factor PF and the direct-current input voltage Ei.

In particular, FIG. 9 illustrates the variation characteristics of the power factor PF and the direct-current input voltage Ei with respect to the variation of the load power Po from 0 to 200 W when the alternating-current input voltage VAC is 100 V, 50 Hz and when the alternating-current input voltage VAC is 230 V, 50 Hz.

Meanwhile, FIG. 10 illustrates the variation characteristics of the power factor PF and the direct-current input voltage Ei with respect to the variation of the alternating-current input voltage VAC from 90 to 288 V when the load power Po is 200 W.

In FIGS. 9 and 10, solid line curves represent characteristics where the power improving function (PFI) is involved, that is, characteristics of the circuit described hereinabove with reference to FIG. 8, and broken lines represent characteristics wherein no circuit configuration for improvement in power factor is involved.

Operation waveforms of several components of the circuit of FIG. 8 are similar to those of the circuit of FIG. 1 and can be recognized with reference to the waveform diagram of FIG. 6.

In this instance, the circuit of FIG. 8 has the following constants:

primary winding N1 of the isolating converter transformer PIT=48 T inductance Lp=68 $\mu$H inductance Ls=33 $\mu$H primary-side parallel resonance capacitor Cr=3,300 pF clamp capacitor C3=0.047 $\mu$F filter capacitor CN=1 $\mu$F As can be seen from FIG. 9, when the alternating-current input voltage VAC is 100 V, where the power factor improving circuit 10A is not provided, within a range of 200 W to 50 W of the load power Po, the power factor PF varies within a range from 0.57 to 0.46 and the direct-current input voltage Ei varies within a range from 131 V to 138 V. However, in the case of the circuit of FIG. 8 which includes the power factor improving circuit 10A, the power factor PF varies within a range from 0.80 to 0.82 and the direct-current input voltage Ei varies within a range from 133 V to 142 V.

On the other hand, when the alternating-current input voltage VAC is 230 V, where power factor improving circuit 10A is not provided, within a range of 200 W to 50 W of the load power Po, the power factor PF varies within a range from 0.47 to 0.39 and the direct-current input voltage Ei varies within a range from 317 V to 320 V. However, in the case of the circuit of FIG. 8 which includes the power factor improving circuit 10A, the power factor PF varies within a range from 0.81 to 0.70 and the direct-current input voltage Ei varies within a range from 329 V to 350 V.

Further, as can be seen from FIG. 10, in the case of the load power Po=200 W, when the alternating-current input voltage VAC varies from 90 V to 270 V, where the power factor improving circuit 10A is not provided, the power factor PF varies within a range from 0.58 to 0.45, but in the circuit of FIG. 8 which includes the power factor improving circuit 10A, the power factor PF varies within a range from 0.85 to 0.80.

In short, a power factor PF of a characteristic which exhibits a comparatively small variation with respect to a great variation of the load power Po or the alternating-current input voltage VAC can be realized.

Meanwhile, the AC/DC power conversion efficiency ($\eta_{AC/DC}$) ranges, when the alternating-current input voltage VAC is 100 V and the load power Po ranges from 50 W to 200 W, from 90.8% to 88.8% where the power factor improving circuit 10A is not provided, but from 90.2% to 85.8% in the case of the circuit of FIG. 8 which includes the power factor improving circuit 10A.

When the alternating-current input voltage VAC is 230 V and the load power Po ranges from 50 W to 200 W, the AC/DC power conversion efficiency ($\eta_{AC/DC}$) ranges from 92.0% to 87.1% where the power factor improving circuit 10A is not provided, but from 90.8% to 83.8% in the case of the circuit of FIG. 8 which includes the power factor improving circuit 10A.

Also in the circuit of FIG. 8, the charging current I1 and the charging current I2 flow separately along the path of the low speed recovery type diode D1 and the path of the high speed recovery type diode D2, and a manner of this can be seen in FIG. 6.

In particular, around a peak of the alternating-current input voltage VAC, the current I1 of the waveform illustrated in FIG. 6 flows through the low speed recovery type diode D1, and therefore, the current I2 flowing through the high speed recovery type diode D2 is not high current.

Fourth Embodiment

Now, a still further switching power supply circuit to which the present invention is applied is described.

The present embodiment achieves, in addition to an object similar to that of the third embodiment described above, improvement of the AC/DC power conversion efficiency ($\eta_{AC/DC}$) where the alternating-current input voltage VAC is a voltage of the 100 V type.

Figure 11:
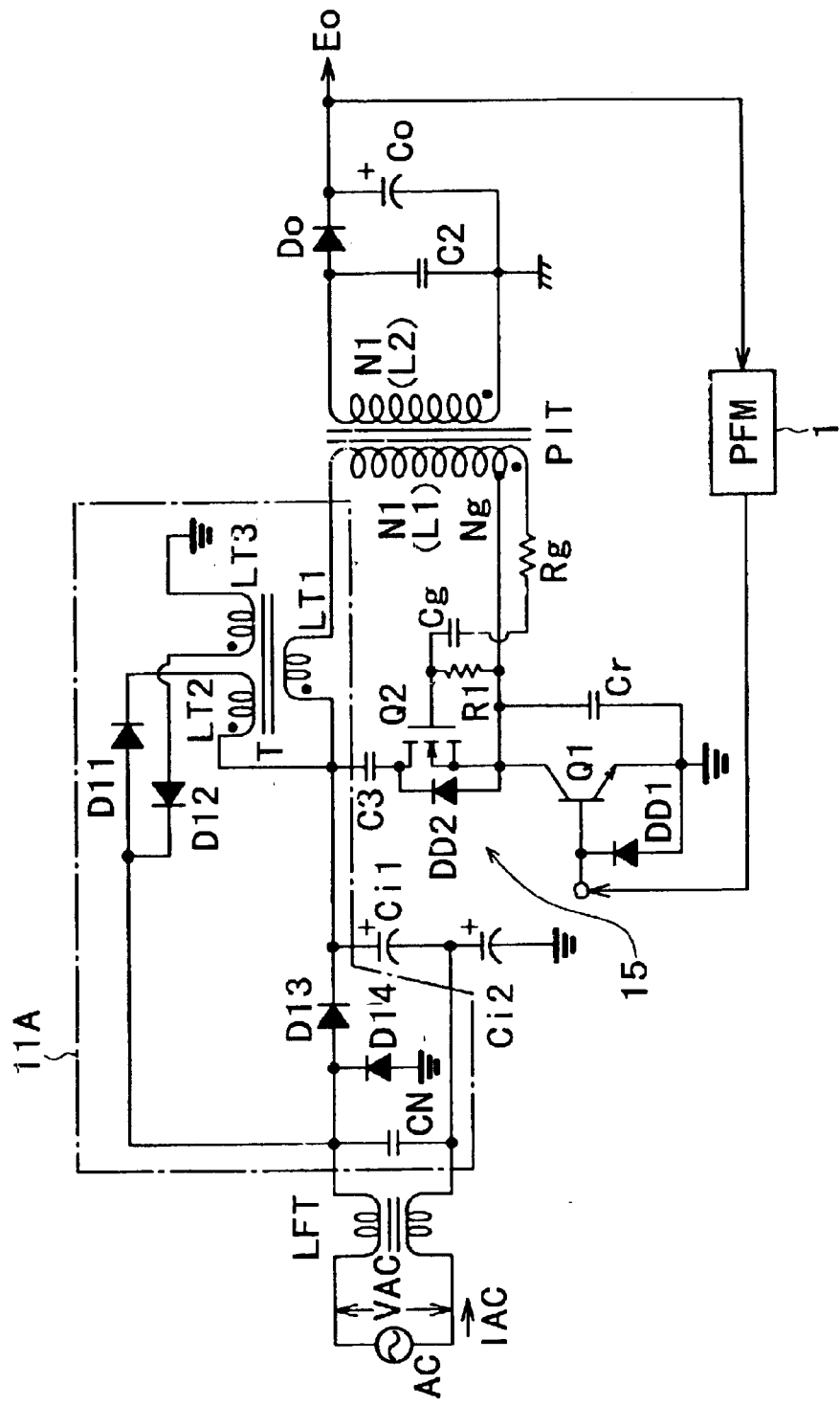
FIG. 11 is a circuit diagram of a still further switching power supply circuit to which the present invention is applied.

FIG. 11 shows the switching power supply circuit according to the fourth embodiment. It is to be noted that the same parts in FIG. 11 as that in FIG. 8 are denoted by the same reference characters in FIG. 8, and the detailed explanation therefor is omitted. The switching power supply circuit in FIG. 11 is different from the circuit of FIG. 8 principally in that it includes a voltage doubler rectifier circuit having a power factor improving function.

Referring to FIG. 11, the power supply circuit shown includes a switching converter of the voltage resonance type (a voltage resonance type converter) provided on the primary side. A rectification circuit having a power factor improving function, that is, a power factor improving rectification circuit 11A, is provided for the voltage resonance type converter.

In the power supply circuit, alternating-current input current IAC from a commercial alternating-current power AC through a line filter transformer LFT is rectified by the power factor improving rectification circuit 11A and smoothed by two smoothing capacitors Ci1 and Ci2 connected in series to obtain a rectified and smoothed voltage Ei as high as twice a rectification smoothed voltage which can be obtained by a full-wave rectifier system, thereby forming a double voltage rectification system.

The voltage resonance type converter has a configuration generally similar to that in the third embodiment.

Also the voltage resonance type converter in the power supply circuit of FIG. 11 includes a single switching element Q1, for example, in the form of a bipolar transistor having a high voltage resisting property.

Further, similarly as in the voltage resonance type converter in the power supply circuit of FIG. 8, a clamp diode DD1 is connected to the switching element Q1 and a parallel resonance capacitor Cr and a primary winding N1 of an isolating converter transformer PIT cooperate with each other to form a primary-side parallel resonant circuit of the voltage resonance type converter through the capacitance of the parallel resonance capacitor Cr and the leakage inductance of the primary winding N1, and an active clamp circuit 15 is formed on the primary side and clamps the voltage resonance pulse voltage.

Furthermore, a resonance capacitor C2 is connected in parallel to a secondary winding N2 of the isolating converter transformer PIT to form a resonance circuit also on the secondary side of the isolating converter transformer PIT so that the voltage resonance type converter is formed as a composite resonance converter, and rectification smoothing is performed by a rectification diode Do and a smoothing capacitor Co to obtain a direct-current output voltage Eo, and besides the switching frequency of the switching element Q1 is controlled by a control circuit 1 in the form of a PFM to stabilize the direct-current output voltage Eo on the secondary side.

It is to be noted that the primary winding N1 of the isolating converter transformer PIT is connected to the positive electrode of the smoothing capacitor Ci1 through a primary winding (inductance LT1) of a transformer T.

The transformer T has the primary winding (inductance LT1) on the primary side and has a secondary winding (inductance LT2) and a tertiary winding (inductance LT3) wound on the secondary side thereof.

Now, a configuration of the power factor improving rectification circuit 11A is described.

The power factor improving rectification circuit 11A has a rectification action for the alternating-current input current IAC and further has a power factor improving function for the alternating-current input current IAC. More particularly, a voltage feedback type power factor improving power supply is formed as a power supply of the voltage doubler rectifier system.

The power factor improving rectification circuit 11A includes a capacitor CN for normal mode noise suppression between ac lines.

The power factor improving rectification circuit 11A further includes two high speed recovery type diodes D11 and D12. The high speed recovery type diodes D11 and D12 are connected in series and interposed the positive terminal of a smoothing capacitor Ci1 and the primary-side ground through a transformer T.

In particular, a winding ending end of the secondary winding (inductance LT2) of the transformer T is connected in series to the cathode of the high speed recovery type diode D11 while a winding starting end of the secondary winding (LT2) is connected to the positive terminal of the smoothing capacitor Ci1. Further, a winding starting end of the tertiary winding (inductance LT3) of the transformer T is connected in series to the anode of the high speed recovery type diode D12, and a winding ending end of the tertiary winding (LT3) is connected to a ground on the primary side.

In each of the secondary winding (inductance LT2) and the tertiary winding (LT3), an induced voltage is generated by primary current flowing through the primary winding (LT1). Consequently, a voltage resonance pulse voltage clamped by the active clamp circuit 15 is voltage fed back to the power factor improving rectification circuit 11A (high speed recovery type diodes D11 and D12 connected in series to the secondary winding (LT2) and the tertiary winding (LT3).)

In this instance, the induced voltages generated in the inductances LT2 and LT3 have polarities opposite to each other.

The power factor improving rectification circuit 11A further includes a series circuit of low speed recovery type diodes D13 and D14 connected to one of the ac lines.

The series circuit of the low speed recovery type diodes D13 and D14 is interposed between the positive terminal of the smoothing capacitor Ci1 and the primary-side ground.

The rectification function of the power factor improving rectification circuit 11A having the configuration described above is described below.

In the power factor improving rectification circuit 11A, the high speed recovery type diodes D11 and D12 function as a first rectification circuit while the low speed recovery type diodes D13 and D14 function as a second rectification circuit.

In particular, within a period within which the alternating-current input voltage VAC is positive, rectification current from the first rectification circuit flows along a route of the alternating-current power supply AC→high speed recovery type diode D11→inductance LT2→smoothing capacitor Ci1 to charge the smoothing capacitor Ci1. Simultaneously, rectification current from the second rectification circuit flows along another route of the alternating-current power supply AC→low speed recovery type diodes D13→smoothing capacitor Ci1 to charge the smoothing capacitor Ci1.

On the other hand, within another period within which the alternating-current input voltage VAC is negative, rectification current from the first rectification circuit flows along a route of the alternating-current power supply AC→the smoothing capacitor Ci2→primary-side ground→inductance LT3→high speed recovery type diode D12 to charge the smoothing capacitor Ci2. Simultaneously, rectification current from the second rectification circuit flows along another route of the alternating-current power supply AC→smoothing capacitor Ci2→primary-side ground→low speed recovery type diode D14 to charge the smoothing capacitor Ci2.

In short, rectification current flows separately from the first and second rectification circuits along two routes to the smoothing capacitors Ci1 and Ci2.

Further, since the smoothing capacitors Ci1 and Ci2 are connected in series and the rectified and smoothed voltage Ei is extracted from the positive terminal side of the smoothing capacitor Ci1, a double voltage rectification system is achieved.

The power factor improving rectification circuit 11A has the following power factor improving function.

To the two high speed recovery type diodes D11 and D12 described above, the secondary winding (inductance LT2) and the tertiary winding (inductance LT3) of the transformer T are connected in series, respectively, so that a switching output (clamped voltage resonance pulse voltage) obtained by the primary-side parallel resonant circuit and flowing through the primary winding (LT1) of the transformer T is fed back to the power factor improving rectification circuit 11A.

An alternating voltage of the switching period originating from the switching output fed back in this manner is superposed on the rectification current paths, and from the superposed alternating current of the switching period, an operation of switching the rectification current on and off in the switching period is obtained at the high speed recovery type diode D11 (or D12). By the switching on/off action, charging current to the smoothing capacitor Ci1 (or Ci2) flows also within a period within which the rectification output voltage level is lower than the voltage across the smoothing capacitor Ci1 (or Ci2).

As a result, the average waveform of the alternating-current input current is controlled so as to approach the waveform of the alternating-current input voltage to increase the conduction angle of the alternating-current input current thereby to achieve improvement in the power factor.

In the power factor improving rectification circuit 11A, charging current to the smoothing capacitors Ci1 and Ci2 flows separately by the action of the first and second rectification circuits described above.

This prevents excessive charging current from flowing through the high speed recovery type diode D11 or D12 when the alternating-current input voltage VAC has a value around a positive or negative peak value. In particular, when the alternating-current input voltage VAC has a value around a positive or negative peak value, charging current flows to the low speed recovery type diodes D13 and D14 while only current of a high frequency flows to the high speed recovery type diodes D11 and D12. Therefore, the power loss of the high speed recovery type diodes D11 and D12 decreases and a high efficiency can be obtained. Consequently, the AC/DC power conversion efficiency ($\eta_{AC/DC}$) can be improved when compared with that of the circuit of FIG. 8.

Further, a diode having a comparative small current capacity can be selectively used for the high speed recovery type diodes D11 and D12. Furthermore, reduction of heat generation may eliminate the necessity for a radiator plate. Consequently, reduction in scale of circuitry and reduction in cost can be anticipated thereby.

Also in the power supply circuit of FIG. 11, the power factor improving circuit 11A is configured such that a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage is reduced is achieved, and this gives rise to another effect that the variation of the power factor is decreased.

Fifth Embodiment

Figure 12:
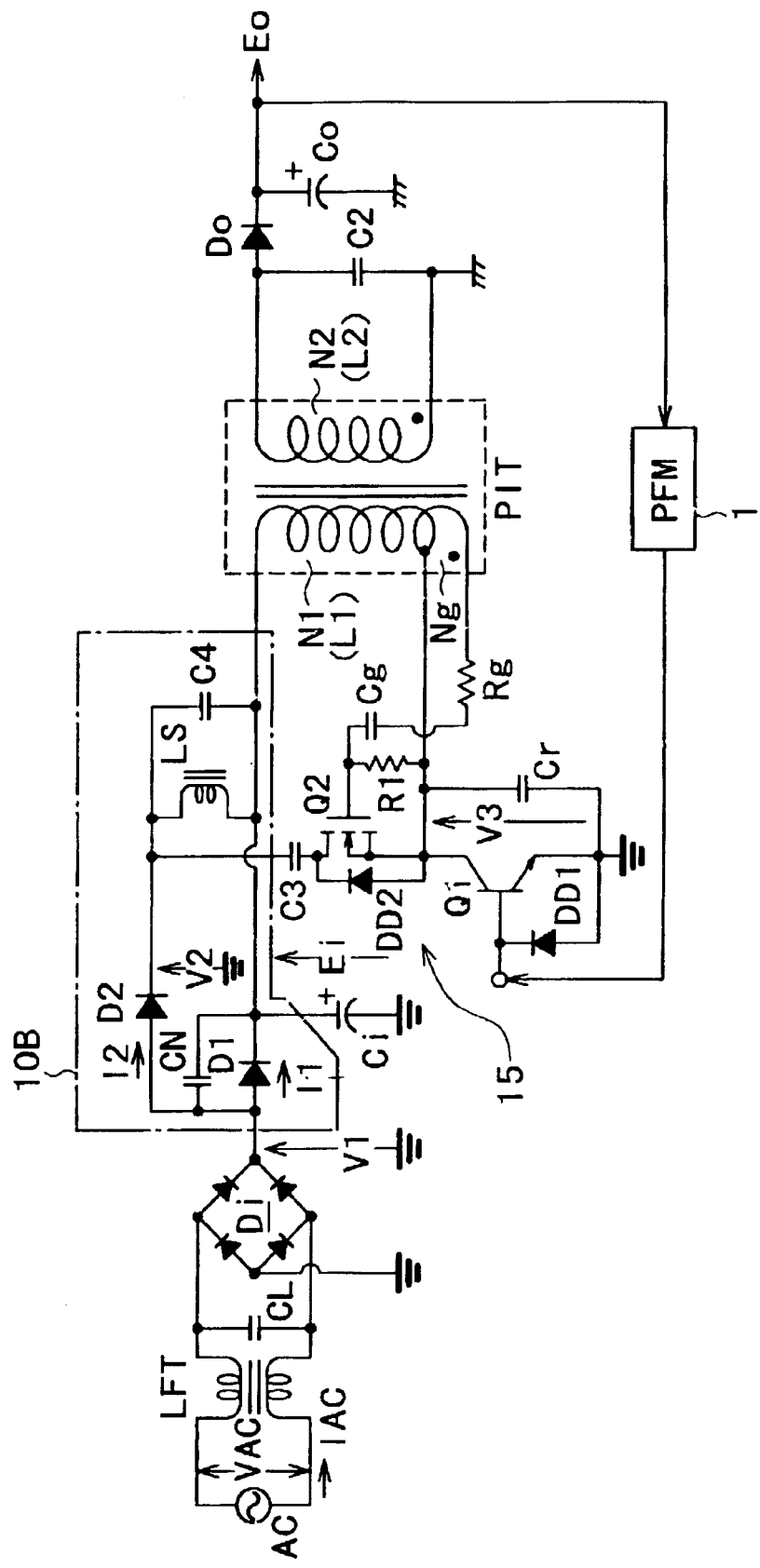
FIG. 12 is a circuit diagram of a yet further switching power supply circuit to which the present invention is applied.

FIG. 12 shows a configuration of a yet further switching power supply circuit to which the present invention is applied.

Referring to FIG. 12, the power supply circuit shown includes a switching converter of the voltage resonance type (a voltage resonance type converter) provided on the primary side. A power factor improving circuit 10B is provided for the voltage resonance type converter.

It is to be noted that the same parts in FIG. 12 as that in FIG. 1 are denoted by the same reference characters in FIG. 1.

Referring to FIG. 12, the power supply circuit shown includes a line filter transformer LFT and an across-the-line capacitor cl provided for a commercial alternating-current power AC and forming a line filter and a bridge rectifier circuit Di for full-wave rectifying the commercial alternating-current power AC in a similar manner as in the power supply circuit of FIG. 1. A rectification full-wave rectified from the bridge rectifier circuit Di is charged to a smoothing capacitor Ci power factor improving circuit 10B, and a rectified and smoothed voltage Ei is obtained across the smoothing capacitor Ci.

Also the voltage resonance type converter which includes a switching element Q1 in the form of a high voltage bipolar transistor has a similar configuration to that in FIG. 1.

In particular, a clamp diode DD1 is interposed between the base of the switching element Q1 and the negative electrode (primary-side ground) of the smoothing capacitor Ci. The emitter of the switching element Q1 is connected to a ground on the primary side.

The collector of the switching element Q1 is connected to the positive terminal of the smoothing capacitor Ci through the primary winding N1 of an isolating converter transformer PIT.

The switching element Q1 performs a switching operation having a switching frequency which is varied with control current applied from a control circuit 1 to the base of the switching element Q1.

Similarly as in the circuit of FIG. 1, a parallel resonance capacitor Cr is connected between the collector and the emitter of the switching element Q1. The parallel resonance capacitor Cr has a capacitance which cooperates with a leakage inductance L1 of the primary winding N1 side of the isolating converter transformer PIT to form a primary-side parallel resonant circuit of the voltage resonance type converter. When the switching element Q1 is off, the voltage across the parallel resonance capacitor Cr exhibits a pulse waveform of a sine wave due to an action of the parallel resonant circuit, and consequently, operation of the voltage resonance type is obtained. It is to be noted that, however, in the present embodiment, the pulse voltage is clamped by an action of an active clamp circuit 15 which is hereinafter described.

The isolating converter transformer PIT has a structure described hereinabove with reference to FIG. 2. In particular, the primary winding N1 and the secondary winding N2 are wound in a divided state around the central magnetic leg of the EE type core so that loose coupling of a coupling coefficient of, for example, k≈0.85 may be obtained thereby to make it difficult to reach a saturation state as much.

An end of the primary winding N1 of the isolating converter transformer PIT is connected to the collector of the switching element Q1 while the other end of the primary winding N1 is connected to the positive terminal (rectified and smoothed voltage Ei) of the smoothing capacitor Ci.

A drive winding Ng is formed through a center tap connection on the primary side of the isolating converter transformer PIT.

It is to be noted that, in the circuit of FIG. 12, different from the circuit shown in FIG. 1, no tertiary winding N3 is formed on the primary side.

Similarly as in the voltage resonance type converter in the power supply circuit of FIG. 1, a resonance capacitor C2 is connected in parallel to a secondary winding N2 of the isolating converter transformer PIT to form a resonance circuit also on the secondary side of the isolating converter transformer PIT so that the voltage resonance type converter is formed as a composite resonance converter, and rectification smoothing is performed by a rectification diode Do and a smoothing capacitor Co to obtain a direct-current output voltage Eo, and besides the switching frequency of the switching element Q1 is controlled by the control circuit 1 in the form of a PFM to stabilize the secondary-side direct-current output voltage Eo on the secondary side.

Also the present power supply circuit includes an active clamp circuit 15 provided on the primary side.

The active clamp circuit 15 includes an auxiliary switching element Q2 in the form of a MOS-FET, a clamp capacitor C3, and a clamp diode DD2 in the form of a body diode. Further, the power supply circuit includes a driving circuit system for driving the auxiliary switching element Q2. The driving circuit system includes a drive winding Ng, a capacitor Cg, and resistors Rg and R1.

The clamp diode DD2 is connected in parallel between the drain and the source of the auxiliary switching element Q2. More particularly, the anode of the clamp diode DD2 is connected to the source of the auxiliary switching element Q2, and the cathode of the clamp diode DD2 is connected to the drain of the auxiliary switching element Q2.

The drain of the auxiliary switching element Q2 is connected to the clamp capacitor C3, which is connected to the cathode of a high speed recovery type diode D2 in the power factor improving circuit 10B.

The source of the auxiliary switching element Q2 is connected to a collector point of the switching element Q1.

Accordingly, the active clamp circuit 15 is configured such that the clamp capacitor C3 is connected in series to the parallel connection circuit of the auxiliary switching element Q2 and the clamp diode DD2.

In the driving circuit system for the auxiliary switching element Q2, the series connection circuit of the capacitor Cg, register Rg and drive winding Ng is connected to the gate of the auxiliary switching element Q2 as seen in FIG. 12. The series connection circuit forms a self-excited driving circuit for the auxiliary switching element Q2. Thus, a signal voltage from the self-excited driving circuit is applied to the gate of the auxiliary switching element Q2 so that a switching operation of the auxiliary switching element Q2 is performed.

In this instance, the drive winding Ng is formed on the winding starting side of the primary winding N1 and has, for example, 1 T (turn) as a turn number.

Consequently, a voltage is generated in the drive winding Ng in response to an alternating voltage obtained by the primary winding N1. Further, in this instance, voltages of the opposite polarities are obtained by the primary winding N1 and the drive winding Ng due to the winding directions of the primary winding N1 and the drive winding Ng.

Figure 13:
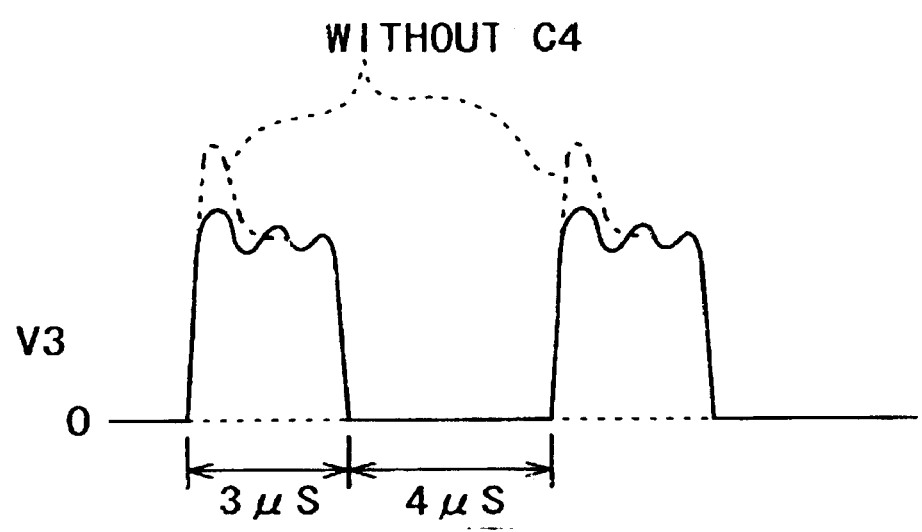
FIG. 13 is a waveform diagram showing a clamped feedback voltage waveform in the switching power supply circuit of FIG. 12.

Accordingly, the switching element Q1 and the auxiliary switching element Q2 are switched on/off alternately. Then, by the operation just described, the voltage resonance pulse voltage V3 generated on the collector side of the switching element Q1 has such a waveform as shown in FIG. 13.

Now, a configuration of the power factor improving circuit 10B is described.

The power factor improving circuit 10B includes a filter capacitor CN for a normal mode filter, a low speed recovery type diode D1, a high speed recovery type diode D2, an inductance Ls and a capacitor C4.

More particularly, in the power factor improving circuit 10B, the low speed recovery type diode D1 is connected in series between the bridge rectifier circuit Di and the positive terminal of the smoothing capacitor Ci.

Further, the capacitor CN for a normal mode filter is connected in parallel to the low speed recovery type diode D1.

Further, the inductance Ls and the capacitor C4 are connected in parallel, and the cathode of the high speed recovery type diode D2 is connected in series to one end of the parallel circuit. The other end of the parallel circuit (inductance Ls and capacitor C4) is connected to the positive electrode of the smoothing capacitor Ci. Accordingly, the series connection of the high speed recovery type diode D2 and the parallel circuit (the inductance Ls and the capacitor C4) is connected in parallel to the low speed recovery type diode D1 and also to the capacitor CN for a normal mode filter.

The power factor improving circuit 10B has the following power factor improving function.

In the power factor improving circuit 10B, rectified current from the bridge rectifier circuit Di flows as charging current to the smoothing capacitor Ci along two different paths including a route along which current I1 flows through the low speed recovery type diode D1 and another route along which current I2 flows as high frequency switching current through the high speed recovery type diode D2 and the inductance Ls.

To the power factor improving circuit 10B, a pulse voltage generated in the active clamp circuit 15, that is, the voltage V3 of FIG. 13, is fed back in response to a voltage resonance pulse voltage obtained by the primary-side parallel resonant circuit.

At this time, when the switching element Q1 is off, current by the induced voltage of the primary winding N1 of the isolating converter transformer PIT flows through the body diode (clamp diode DD2) of the auxiliary switching element Q2 and then through the clamp capacitor C3 and the inductance Ls. Thus, since the capacitor C4 is connected in parallel to the inductance Ls, a peak value of the voltage V3 is lowered by the capacitor C4 and fed back as seen from FIG. 13.

With the switching output fed back in this manner, an alternating voltage of the switching period is superposed on the current path of the current I2 which flows through the high speed recovery type diode D2 and the inductance Ls. Thus, by the superposed alternating voltage of the switching period, an operation for switching the rectification current on and off in the switching period is obtained at the high speed recovery type diode D2.

In particular, when the cathode voltage V2 of the high speed recovery type diode D2 is lower than the anode voltage, that is, the rectification voltage V1, the high speed recovery type diode D2 performs on/off operations. By the on/off operations, charging current to the smoothing capacitor Ci flows also within a period within which the rectification output voltage level V1 is lower than the voltage across the smoothing capacitor Ci.

As a result, the average waveform of the alternating-current input current is controlled so as to approach the waveform of the alternating-current input voltage to increase the conduction angle of the alternating-current input current thereby to achieve improvement in the power factor.

While the charging current to the smoothing capacitor Ci flows separately along the path provided by the low speed recovery type diode D1 and the path provided by the high speed recovery type diode D2 and the inductance Ls as described above, the low speed recovery type diode D1 conducts only when the alternating-current input voltage VAC has a value around positive and negative peak values. In other words, the charging current I1 flows only when the alternating-current input voltage VAC has a value around a peak value thereof. Therefore, the low speed recovery type diode D1 prevents excessively high charging current from flowing to the high speed recovery type diode D2 around positive and negative peak values of the alternating-current input voltage VAC. Consequently, the power loss of the high speed recovery type diode D2 decreases, and a higher efficiency can be achieved.

Accordingly, a diode having a comparative small current capacity can be selectively used for the diodes D1 and D2. Further, reduction of heat generation may eliminate the necessity for a radiator plate, and reduction in scale of circuitry and reduction in cost can be anticipated thereby.

Further, in the power factor improving circuit 10B, a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, as described hereinabove, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage illustrated in FIG. 13 is reduced is achieved, and this gives rise to another effect that the variation of the power factor is decreased.

FIGS. 14 and 15 illustrate variation characteristics of the power factor PF and the direct-current input voltage Ei.

In particular, FIG. 14 illustrates the variation characteristics of the power factor PF and the direct-current input voltage Ei with respect to the variation of the load power Po from 0 to 200 W when the alternating-current input voltage VAC is 100 V, 50 Hz and when the alternating-current input voltage VAC is 230 V, 50 Hz.

Meanwhile, FIG. 15 illustrates the variation characteristics of the power factor PF and the direct-current input voltage Ei with respect to the variation of the alternating-current input voltage VAC from 90 to 288 V when the load power Po is 200 W.

In FIGS. 14 and 15, solid line curves represent characteristics where the power improving function (PFI) is involved, that is, characteristics of the circuit described hereinabove with reference to FIG. 12, and broken lines represent characteristics wherein no circuit configuration for improvement in power factor is involved.

Operation waveforms of several components of the circuit in FIG. 12 are similar to those of the circuit in FIG. 1 and can be recognized with reference to the waveform diagram in FIG. 6.

In this instance, the circuit of FIG. 12 has the following constants:

primary winding N1 of the isolating converter transformer PIT=53 T inductance Ls=22 $\mu$H primary-side parallel resonance capacitor Cr=3,300 pF clamp capacitor C3=0.047 $\mu$F capacitor C4=6,800 pF filter capacitor CN=1 $\mu$H As can be seen from FIG. 14, when the alternating-current input voltage VAC is 100 V, where the power factor improving circuit 10B is not provided, within a range of 200 W to 50 W of the load power Po, the power factor PF varies within a range from 0.57 to 0.46 and the direct-current input voltage Ei varies within a range from 131 V to 138 V. However, in the case of the circuit of FIG. 12 which includes the power factor improving circuit 10B, the power factor PF varies within a range from 0.82 to 0.80 and the direct-current input voltage Ei varies within a range from 133 V to 143 V.

On the other hand, when the alternating-current input voltage VAC is 230 V, where power factor improving circuit 10B is not provided, within a range of 200 W to 50 W of the load power Po, the power factor PF varies within a range from 0.47 to 0.39 and the direct-current input voltage Ei varies within a range from 317 V to 320 V. However, in the case of the circuit of FIG. 12 which includes the power factor improving circuit 10B, the power factor varies within a range from 0.80 to 0.74 and the direct-current input voltage Ei varies within a range from 328 V to 350 V.

Further, as can be seen from FIG. 15, in the case of the load power Po=200 W, when the alternating-current input voltage VAC varies from 90 V to 270 V, where the power factor improving circuit 10B is not provided, the power factor PF varies within a range from 0.58 to 0.45, but in the circuit of FIG. 12 which includes the power factor improving circuit 10B, the power factor PF varies within a range from 0.85 to 0.80.

In short, a power factor PF of a characteristic which exhibits a comparatively small variation with respect to a great variation of the load power Po or the alternating-current input voltage VAC can be realized.

Meanwhile, the AC/DC power conversion efficiency ($\eta_{AC/DC}$) ranges, when the alternating-current input voltage VAC is 100 V and the load power Po ranges from 200 W to 50 W, from 90.8% to 88.8% where the power factor improving circuit 10B is not provided, but from 90.7% to 86.9% in the case of the circuit of FIG. 12 which includes the power factor improving circuit 10B.

When the alternating-current input voltage VAC is 230 V and the load power Po ranges from 200 W to 50 W, the AC/DC power conversion efficiency ($\eta_{AC/DC}$) ranges from 92.0% to 87.1% where the power factor improving circuit 10B is not provided, but from 91.4% to 85.1% in the case of the circuit of FIG. 12 which includes the power factor improving circuit 10B.

A manner wherein the charging current I1 and the charging current I2 flow separately along the path of the low speed recovery type diode D1 and the path of the high speed recovery type diode D2 as described above can be seen in FIG. 6.

In particular, around a peak of the alternating-current input voltage VAC, the current I1 of the waveform illustrated in FIG. 6 flows through the low speed recovery type diode D1, and therefore, the current I2 flowing through the high speed recovery type diode D2 is not high current.

Sixth Embodiment

Now, a yet further switching power supply circuit to which the present invention is applied is described.

The present embodiment achieves, in addition to an object similar to that of the fifth embodiment described above, improvement of the AC/DC power conversion efficiency ($\eta_{AC/DC}$) where the alternating-current input voltage VAC is a voltage of the 100 V type.

Figure 16:
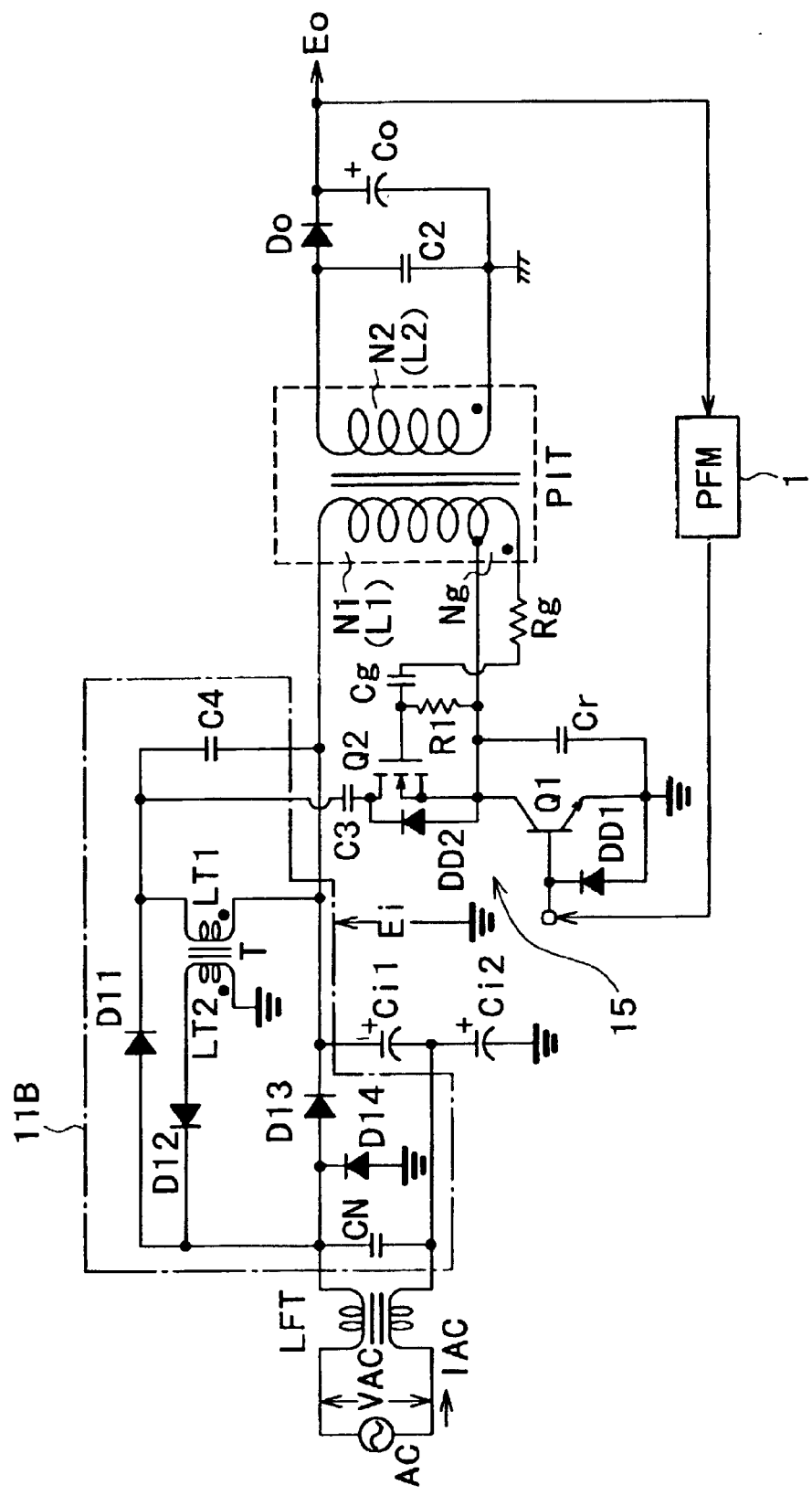
FIG. 16 is a circuit diagram of a yet further switching power supply circuit to which the present invention is applied.

FIG. 16 shows the switching power supply circuit according to the sixth embodiment. The switching power supply circuit is different from the circuit of FIG. 12 principally in that it includes a voltage doubler rectifier circuit having a power factor improving function.

Referring to FIG. 11, the power supply circuit shown includes a switching converter of the voltage resonance type (a voltage resonance type converter) provided on the primary side. A rectification circuit having a power factor improving function, that is, a power factor improving rectification circuit 11B, is provided for the voltage resonance type converter.

In the power supply circuit, alternating-current input current IAC from a commercial alternating-current power AC through a line filter transformer LFT is rectified by the power factor improving rectification circuit 11B and smoothed by two smoothing capacitors Ci1 and Ci2 connected in series to obtain a rectified and smoothed voltage Ei as high as twice a rectified and smoothed voltage which can be obtained by a full-wave rectifier system, thereby forming a double voltage rectification system.

The voltage resonance type converter has a configuration generally similar to that in the fifth embodiment.

Also the voltage resonance type converter in the power supply circuit of FIG. 11 includes a single switching element Q1, for example, in the form of a high voltage bipolar transistor.

Further, similarly as in the voltage resonance type converter in the power supply circuit of FIG. 12, a clamp diode DD1 is connected to the switching element Q1 and a parallel resonance capacitor Cr and a primary winding N1 of an isolating converter transformer PIT cooperate with each other to form a primary-side parallel resonant circuit of the voltage resonance type converter through the capacitance of the parallel resonance capacitor Cr and the leakage inductance of the primary winding N1, and an active clamp circuit 15 is formed on the primary side such that a pulse voltage generated by the active clamp circuit 15 is fed back to the power factor improving rectification circuit 11B.

Furthermore, similarly as in the voltage resonance type converter in the power supply circuit of FIG. 1, a resonance capacitor C2 is connected in parallel to a secondary winding N2 of the isolating converter transformer PIT to form a resonance circuit also on the secondary side of the isolating converter transformer PIT so that the voltage resonance type converter is formed as a composite resonance converter, and rectification smoothing is performed by a rectification diode Do and a smoothing capacitor Co to obtain a direct-current output voltage Eo, and besides the switching frequency of the switching element Q1 is controlled by a control circuit 1 in the form of a PFM to stabilize the direct-current output voltage Eo on the secondary side.

Now, a configuration of the power factor improving rectification circuit 11B is described.

The power factor improving rectification circuit 11B has a rectification action for the alternating-current input current IAC and further has a power factor improving function for the alternating-current input current IAC. More particularly, a voltage feedback type power factor improving power supply is formed as a power supply of the voltage doubler rectifier system.

The power factor improving rectification circuit 11B includes a capacitor CN for normal mode noise suppression between ac lines.

The power factor improving rectification circuit 11B further includes two high speed recovery type diodes D11 and D12. The high speed recovery type diodes D11 and D12 are connected in series and interposed the positive terminal of a smoothing capacitor Ci1 and the primary-side ground through a transformer T.

In particular, the primary winding (inductance LT1) of the transformer T is connected in series to the cathode of the high speed recovery type diode D11 while the other end of the primary winding (LT1) is connected to the positive terminal of the smoothing capacitor Ci1. Further, the secondary winding (inductance LT2) of the transformer T is connected in series to the anode of the high speed recovery type diode D12, and the other end of the secondary winding (LT2) is connected to a ground on the primary side.

A capacitor C4 is connected in parallel to the primary winding (inductance LT1) of the transformer T. Accordingly, the high speed recovery type diode D12, the high speed recovery type diode D11 and the parallel circuit of the inductance LT1 and the capacitor C4 are connected in series.

The clamp capacitor C3 of the active clamp circuit 15 is connected to the node between the parallel circuit and the high speed recovery type diode D11, that is, the cathode of the high speed recovery type diode D11.

Consequently, a pulse voltage generated by the active clamp circuit 15 is fed back to the power factor improving rectification circuit 11B.

The power factor improving rectification circuit 11B further includes a series circuit of low speed recovery type diodes D13 and D14 connected to one of the ac lines.

The series circuit of the low speed recovery type diodes D13 and D14 is interposed between the positive terminal of the smoothing capacitor Ci1 and the primary-side ground.

The rectification function of the power factor improving rectification circuit 11B having the configuration described above is described below.

In the power factor improving rectification circuit 11B, the high speed recovery type diodes D11 and D12 function as a first rectification circuit while the low speed recovery type diodes D13 and D14 function as a second rectification circuit.

In particular, within a period within which the alternating-current input voltage VAC is positive, rectification current from the first rectification circuit flows along a route of the alternating-current power supply AC→high speed recovery type diode D11→inductance LT1→smoothing capacitor Ci1 to charge the smoothing capacitor Ci1. Simultaneously, rectification current from the second rectification circuit flows along another route of the alternating-current power supply AC→low speed recovery type diodes D13→smoothing capacitor Ci1 to charge the smoothing capacitor Ci1.

On the other hand, within another period within which the alternating-current input voltage VAC is negative, rectification current from the first rectification circuit flows along a route of the alternating-current power supply AC→the smoothing capacitor Ci2→primary-side ground→inductance LT2→high speed recovery type diode D12 to charge the smoothing capacitor Ci2. Simultaneously, rectification current from the second rectification circuit flows along another route of the alternating-current power supply AC→smoothing capacitor Ci2→primary-side ground→low speed recovery type diode D14 to charge the smoothing capacitor Ci2.

In short, rectification current flows separately from the first and second rectification circuits along two routes to the smoothing capacitors Ci1 and Ci2.

Further, since the smoothing capacitors Ci1 and Ci2 are connected in series and the rectified and smoothed voltage Ei is extracted from the positive terminal side of the smoothing capacitor Ci1, a double voltage rectification system is achieved.

The power factor improving rectification circuit 11B has the following power factor improving function.

To the two high speed recovery type diodes D11 and D12, a pulse voltage generated by the active clamp circuit 15 is fed back as described above.

An alternating voltage of the switching period originating from the pulse voltage fed back in this manner is superposed on the rectification current paths, and from the superposed alternating voltage of the switching period, an operation of switching the rectification current on and off in the switching period is obtained at the high speed recovery type diode D11 (or D12). By the switching on/off action, charging current to the smoothing capacitor Ci1 (or Ci2) flows also within a period within which the rectification output voltage level is lower than the voltage across the smoothing capacitor Ci1 (or Ci2).

As a result, the average waveform of the alternating-current input current is controlled so as to approach the waveform of the alternating-current input voltage to increase the conduction angle of the alternating-current input current thereby to achieve improvement in the power factor.

In the power factor improving rectification circuit 11B, charging current to the smoothing capacitors Ci1 and Ci2 flows separately by the action of the first and second rectification circuits described above.

This prevents excessive charging current from flowing through the high speed recovery type diode D11 or D12 when the alternating-current input voltage VAC has a value around a positive or negative peak value. In particular, when the alternating-current input voltage VAC has a value around a positive or negative peak value, charging current flows to the low speed recovery type diodes D13 and D14 while only current of a high frequency flows to the high speed recovery type diodes D11 and D12. Therefore, the power loss of the high speed recovery type diodes D11 and D12 decreases and a high efficiency can be obtained. Consequently, the AC/DC power conversion efficiency ($\eta_{AC/DC}$) can be improved when compared with that of the circuit of FIG. 12.

Further, a diode having a comparative small current capacity can be selectively used for the high speed recovery type diodes D11 and D12. Furthermore, reduction of heat generation may eliminate the necessity for a radiator plate. Consequently, reduction in scale of circuitry and reduction in cost can be anticipated thereby.

Also in the power supply circuit of FIG. 16, the power factor improving circuit 11B is configured such that a voltage resonance pulse voltage is fed back without intervention of such a series resonant capacitor C10 as shown in FIG. 17. This facilitates circuit designing and is effective to realize a power factor which exhibits a reduced variation against a variation of the alternating-current input voltage VAC or the load power.

Further, the active clamp circuit 15 is formed on the primary side and increases the switching control range. Consequently, a switching power supply circuit ready for worldwide use with the AC 100 V type and the AC 200 V type can be achieved, and a decrease of the voltage resisting property of a transistor used as the switching element Q1 can be achieved.

Furthermore, since the pulse width of the voltage resonance pulse voltage (clamp voltage) when the switching element Q1 is off is increased by the active clamp circuit 15 as the alternating-current input voltage VAC rises, also an effect that the variation of the voltage feedback pulse voltage is reduced is achieved, and this gives rise to another effect that the variation of the power factor is decreased.

While several embodiments have been described above, according to the present invention, various other modifications are possible.

For example, whereas composite resonance type switching converters configured such that they include a full-wave rectification circuit, a voltage doubler rectifier circuit, a quadruple voltage rectification circuit and so forth which utilize a secondary side direct-current resonance circuit have been proposed by the assignee of the present application, also such configurations may be applied as modifications to the embodiments described above. In other words, the present invention is not restricted particularly to the embodiments wherein a resonance circuit and a rectification circuit are provided on the secondary side.

Further, while the voltage resonance type converter on the primary side in the embodiments described above have a configuration of the single end type wherein a single switching element is provided, the present invention can be applied also to a voltage resonance type converter of the push-pull type wherein two switching elements are switched alternately.

Furthermore, for the switching driving system for the switching element, a switching driving system of any one of the self-excited oscillation type and the separately excited oscillation type may be adopted. Also for the switching element, not only a bipolar transistor of a high voltage resisting property but also a MOS-FET may be used.

While preferred embodiments of the present invention have been described using specific terms, such description is for illustrative purposes only, and it is to be understood that changes and variations may be made without departing from the spirit or scope of the following claims.

What is claimed is:

1. A switching power supply circuit, comprising:

rectifying smoothing means for rectifying a alternating-current power by means of a bridge rectification circuit to obtain a direct-current input voltage, smoothing the direct-current input voltage by means of a smoothing capacitor and outputting the smoothed direct-current input voltage;

an isolating converter transformer for transmitting a primary side output to a secondary side thereof, said isolating converter transformer having a gap formed therein so that a required coupling coefficient with which a primary winding and a secondary winding are coupled loosely may be obtained;

switching means for switching the direct-current input voltage on and off by means of a switching element and outputting the resulting voltage to said primary winding of said isolating converter transformer;

a primary-side resonance circuit formed at least from a leakage inductance component including said primary winding of said isolating converter transformer and a capacitance of a primary side parallel resonance capacitor for causing said switching means to perform operation of the voltage resonance type;

voltage generation means for generating a voltage corresponding to a switching output voltage obtained by said primary-side resonance circuit;

power factor improving means including a low speed recovery type diode, a high speed recovery type diode and an inductance for feeding back the voltage obtained by said voltage generation means, said low speed recovery type diode being connected between said bridge rectification circuit and said smoothing capacitor, at least said high speed recovery type diode and said inductance being connected in series, the series connection of said high speed recovery type diode and said inductance being connected in parallel to said low speed recovery type diode;

active clamp means formed from a series connection circuit of a clamp capacitor and an auxiliary switching element for clamping the output voltage of said primary-side resonance circuit;

a secondary-side resonance circuit formed from a leakage inductance component of said secondary winding of said isolating converter transformer and a capacitance of a secondary side resonance capacitor on the secondary side; and direct-current output voltage production means formed by including said secondary-side resonance circuit for receiving and rectifying an alternating voltage obtained by said secondary winding of said isolating converter transformer to produce a secondary-side direct-current output voltage.

2. The switching power supply circuit according to claim 1, further comprising constant-voltage control means for performing constant-voltage control for the secondary-side direct-current output voltage in response to a level of the secondary-side direct-current output voltage.

3. The switching power supply circuit according to claim 1, wherein said isolating converter transformer further includes a tertiary winding provided on the primary side thereof and serving as said voltage generation means, and the switching output voltage obtained by said primary-side resonance circuit is fed back to said power factor improving means through said tertiary winding.

4. The switching power supply circuit according to claim 1, further comprising a transformer including a secondary winding which serves as said inductance of said power factor improving means, and wherein a primary winding of said transformer is connected between said primary winding of said isolating converter transformer and said smoothing capacitor and serves as said voltage generation means, and the switching output voltage obtained by said primary-side resonance circuit is fed back to said power factor improving means through said transformer.

5. The switching power supply circuit according to claim 1, further comprising a capacitor connected in parallel to said inductance of said power factor improving means to form a parallel circuit, and wherein said clamp capacitor of said active clamp means is connected to a node between said high speed recovery type diode and said parallel circuit and serves as said voltage generation means, and a pulse voltage generated in a series connection circuit of said clamp capacitor and said auxiliary switching element is fed back to said power factor improving means in response to the switching output voltage obtained by said primary-side resonance circuit.

6. A switching power supply circuit, comprising:

double direct-current rectifying and smoothing means for double direct-current rectifying alternating-current power and smoothing said rectification current by means of a pair of smoothing capacitors connected in series and outputting a double direct-current input voltage;

an isolating converter transformer for transmitting a primary side output to a secondary side thereof, said isolating converter transformer having a gap formed therein so that a required coupling coefficient with which a primary winding and a secondary winding are coupled loosely may be obtained;

switching means for switching the double direct-current input voltage on and off by means of a switching element and outputting the resulting voltage to said primary winding of said isolating converter transformer;

a primary-side resonance circuit formed at least from a leakage inductance component including said primary winding of said isolating converter transformer and a capacitance of a primary side parallel resonance capacitor for causing said switching means to perform operation of the voltage resonance type;

voltage generation means for generating a voltage corresponding to a switching output voltage obtained by said primary-side resonance circuit;

power factor improving rectification means including a first rectification circuit formed from a pair of high speed recovery type diodes connected in series and a second rectification circuit formed from a pair of low speed recovery type diodes connected in series for rectifying an alternating-current power supply to produce rectification current and supplying the rectification current to said smoothing means, said power factor improving means further including a first inductance to which one of said high speed recovery type diodes is connected in series and a second inductance to which the other of said high speed recovery type diodes is connected in series, said high speed recovery type diodes switching the rectification current on and off based on the voltage obtained by said voltage generation means to improve the power factor;

active clamp means formed from a series connection circuit of a clamp capacitor and an auxiliary switching element for clamping the voltage based on said primary-side resonance circuit;

a secondary-side resonance circuit formed from a leakage inductance component of said secondary winding of said isolating converter transformer and a capacitance of a secondary side resonance capacitor on the secondary side; and direct-current output voltage production means formed by including said secondary-side resonance circuit for receiving and rectifying an alternating voltage obtained by said secondary winding of said isolating converter transformer to produce a secondary-side direct-current output voltage.

7. The switching power supply circuit according to claim 6, further comprising constant-voltage control means for performing constant-voltage control for the secondary-side direct-current output voltage in response to a level of the secondary-side direct-current output voltage.

8. The switching power supply circuit according to claim 6, wherein a tertiary winding is provided on the primary side of said isolating converter transformer and serves as said voltage generation means, said power factor improving rectification means including a transformer having a primary winding which serves as said first inductance and a secondary winding which serves as said second inductance, said tertiary winding of said isolating converter transformer being connected to a node between said high speed recovery type diodes, said high speed recovery type diodes switching the rectification current on and off based on the voltage obtained by said voltage generation means.

9. The switching power supply circuit according to claim 6, wherein said power factor improving rectification means includes a transformer having a primary winding, a secondary winding which serves as said first inductance and a tertiary winding which serves as said second inductance, said primary winding of said transformer being connected in series to said primary winding of said isolating converter transformer and serving as said voltage generation means, said high speed recovery type diodes switching the rectification current on and off based on the voltage obtained by said voltage generation means.

10. The switching power supply circuit according to claim 6, wherein said power factor improving rectification means includes a transformer including a primary winding which serves as said first inductance and a secondary winding which services as a second inductance and a capacitor connected in parallel to said primary winding of said transformer to form a parallel circuit, said clamp capacitor of said active clamp means being connected to a node between one of said high speed recovery type diodes and said parallel circuit, said high speed recovery type diodes switching the rectification current on and off based on the voltage obtained by said voltage generation means to improve the power factor.

* * * * *